(12) United States Patent
Merrill

(10) Patent No.: US 9,939,560 B2
(45) Date of Patent: Apr. 10, 2018

(54) DIFFUSE REFLECTIVE OPTICAL FILMS WITH SPATIALLY SELECTIVE BIREFRINGENCE REDUCTION

(75) Inventor: William Ward Merrill, White Bear Lake, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 999 days.

(21) Appl. No.: 13/703,518

(22) PCT Filed: Jun. 29, 2011

(86) PCT No.: PCT/US2011/142358
§ 371 (c)(1),
(2), (4) Date: Dec. 11, 2012

(87) PCT Pub. No.: WO2012/003213
PCT Pub. Date: Jan. 5, 2012

(65) Prior Publication Data
US 2013/0094088 A1 Apr. 18, 2013

Related U.S. Application Data

(60) Provisional application No. 61/360,124, filed on Jun. 30, 2010.

(51) Int. Cl.
*G02B 5/30* (2006.01)
*G02B 5/02* (2006.01)
(Continued)

(52) U.S. Cl.
CPC ............... *G02B 5/02* (2013.01); *B42D 25/00* (2014.10); *B42D 25/29* (2014.10); *B42D 25/382* (2014.10);
(Continued)

(58) Field of Classification Search
CPC .. G02B 5/3058; G02B 5/3008; G02B 5/0833; G02B 5/0858; G02B 5/285;
(Continued)

(56) References Cited

U.S. PATENT DOCUMENTS 2,604,817 A * 7/1952 Schupp, Jr. .......... G02B 5/3008
359/489.01
4,417,948 A 11/1983 Mayne-Banton
(Continued)

FOREIGN PATENT DOCUMENTS

EP 1900509 3/2008
GB 2420188 5/2006
(Continued)

OTHER PUBLICATIONS

Baba, "Patterned Optical Polarising Films Fabricated by Laser Writing on Stretched Silver Island Multilayers", Electronics Letters, Jul. 22, 1999, vol. 35, No. 15, pp. 1249-1251.
(Continued)

*Primary Examiner* — Stephone B Allen
*Assistant Examiner* — Jyotsna Dabbi
(74) *Attorney, Agent, or Firm* — Gregory D. Allen

(57) ABSTRACT

A diffusely reflective optical film includes a blended layer extending from a first to a second zone of the film. The blended layer includes first and second polymer materials separated into distinct first and second phases, respectively. The blended layer may have the same composition and thickness in the first and second zones, but different first and second diffusely reflective characteristics in the first and second zones, respectively. The difference between the first and second diffusely reflective characteristics may not be attributable to any difference in composition or thickness of the layer between the first and second zones. Instead, the difference between the first and second diffusely reflective (Continued)

characteristic may be attributable to a difference in birefringence of the first and/or second polymer materials between the first and second zones. The blend morphology of the blended layer may be substantially the same in the first and second zones.

31 Claims, 11 Drawing Sheets

(51) Int. Cl.
- *B42D 25/45* (2014.01)
- *B42D 25/387* (2014.01)
- *B44F 1/02* (2006.01)
- *B42D 25/41* (2014.01)
- *B42D 25/29* (2014.01)
- *B42D 25/00* (2014.01)
- *B42D 25/382* (2014.01)
- *B42D 25/391* (2014.01)

(52) U.S. Cl.
CPC ......... *B42D 25/387* (2014.10); *B42D 25/391* (2014.10); *B42D 25/41* (2014.10); *B42D 25/45* (2014.10); *B44F 1/02* (2013.01); *G02B 5/0242* (2013.01); *G02B 5/305* (2013.01); *G02B 5/3008* (2013.01); *B42D 2033/18* (2013.01); *B42D 2033/30* (2013.01); *B42D 2035/20* (2013.01)

(58) Field of Classification Search
CPC .... G02B 5/3033; G02B 5/3083; G02B 5/305; G02B 5/3025; G02B 27/281; G02B 27/286; G02B 27/283; G02B 27/144; G02B 27/142; G02B 5/02; G02B 2033/18; G02B 6/29358; G02B 1/115; G02B 1/113; G02B 1/105; G03F 7/70566; F21V 9/14; B29D 11/00413; B29L 2011/0016; B29L 2031/7224; B29C 2035/0827; B29C 2035/0838; A61F 2002/1686; C23C 18/1603; C23C 14/28; H05K 3/185; C03C 17/10; H01L 39/2409; B42D 2033/18; B42D 2033/30; B42D 25/00; B42D 25/29; B42D 25/382; B42D 25/387; B42D 25/391; B42D 25/41; B42D 25/45; B44F 1/02
USPC ........... 359/483.01, 486.01, 486.02, 486.03, 359/489.01, 489.07, 489.15, 489.16, 359/489.17, 485.01, 485.03, 489.06, 359/489.08, 489.11, 489.12, 489.13, 359/489.19, 577, 580, 583, 584, 586, 588, 359/589, 590, 489.09; 362/19; 353/20; 264/1.1, 1.31, 1.34, 1.35, 1.36, 1.37, 482; 427/553, 554, 555, 595, 596, 162, 163.1
See application file for complete search history.

(56) References Cited

U.S. PATENT DOCUMENTS

| | | | |
|---|---|---|---|
| 4,551,819 A | 11/1985 | Michl | |
| 4,568,632 A | 2/1986 | Blum | |
| 4,822,451 A | 4/1989 | Ouderkirk | |
| 4,864,537 A | 9/1989 | Michl | |
| 4,879,176 A | 11/1989 | Ouderkirk | |
| 4,902,378 A | 2/1990 | Ouderkirk | |
| 5,023,859 A | 6/1991 | Eich | |
| 5,103,337 A | 4/1992 | Schrenk | |
| 5,217,794 A * | 6/1993 | Schrenk | B29C 47/0019 428/220 |
| 5,234,729 A | 8/1993 | Wheatley | |
| 5,251,197 A | 10/1993 | Leube | |
| 5,264,491 A * | 11/1993 | Quirk | C08G 63/00 525/146 |
| 5,302,259 A | 4/1994 | Birngruber | |
| 5,316,900 A | 5/1994 | Tsujioka | |
| 5,327,285 A | 7/1994 | Faris | |
| 5,360,659 A | 11/1994 | Arends | |
| 5,389,324 A | 2/1995 | Lewis | |
| 5,486,949 A | 1/1996 | Schrenk | |
| 5,633,123 A | 5/1997 | Hill | |
| 5,757,016 A | 5/1998 | Dunn | |
| 5,783,120 A | 7/1998 | Ouderkirk | |
| 5,825,543 A | 10/1998 | Ouderkirk | |
| 5,882,774 A | 3/1999 | Jonza | |
| 6,045,894 A | 4/2000 | Jonza | |
| 6,096,247 A | 8/2000 | Ulsh | |
| 6,157,490 A | 12/2000 | Wheatley | |
| 6,179,948 B1 | 1/2001 | Merrill | |
| 6,207,260 B1 | 3/2001 | Wheatley | |
| 6,256,114 B1 | 7/2001 | Merrill | |
| 6,256,435 B1 | 7/2001 | Albert | |
| 6,288,842 B1 | 9/2001 | Florczak | |
| 6,352,761 B1 | 3/2002 | Hebrink | |
| 6,368,699 B1 | 4/2002 | Gilbert | |
| 6,459,514 B2 | 10/2002 | Gilbert | |
| 6,496,239 B2 | 12/2002 | Seiberle | |
| 6,496,287 B1 | 12/2002 | Seiberle | |
| 6,531,230 B1 | 3/2003 | Weber | |
| 6,590,707 B1 | 7/2003 | Weber | |
| 6,628,877 B2 | 9/2003 | Dugan | |
| 6,650,615 B1 | 11/2003 | Yamamoto | |
| 6,673,275 B1 | 1/2004 | Allen | |
| 6,673,425 B1 | 1/2004 | Hebrink | |
| 6,749,427 B1 | 6/2004 | Bretscher | |
| 6,783,349 B2 | 8/2004 | Neavin | |
| 6,788,463 B2 | 9/2004 | Merrill | |
| 6,830,713 B2 | 12/2004 | Hebrink | |
| 6,888,612 B2 | 5/2005 | Faris | |
| 6,939,499 B2 | 9/2005 | Merrill | |
| 7,019,905 B2 | 3/2006 | Weber | |
| 7,052,812 B1 | 5/2006 | Wang | |
| 7,057,816 B1 | 6/2006 | Allen | |
| 7,064,897 B2 | 6/2006 | Hebrink | |
| 7,077,649 B2 | 7/2006 | Bretscher | |
| 7,116,387 B2 | 10/2006 | Tsai | |
| 7,187,396 B2 | 3/2007 | Carroll, Jr. | |
| 7,223,515 B1 | 5/2007 | Wolk | |
| 7,256,936 B2 | 8/2007 | Hebrink | |
| 7,316,558 B2 | 1/2008 | Merrill | |
| 7,604,381 B2 | 10/2009 | Hebrink | |
| 7,742,136 B2 | 6/2010 | Umemoto | |
| 2004/0164434 A1* | 8/2004 | Tabar | B29C 47/0021 264/1.6 |
| 2006/0082702 A1 | 4/2006 | Jacobs | |
| 2006/0154077 A1 | 7/2006 | Hammond-Smith | |
| 2006/0204720 A1 | 9/2006 | Biernath | |
| 2006/0257679 A1 | 11/2006 | Benson, Jr. | |
| 2007/0047261 A1 | 3/2007 | Thompson | |
| 2007/0065636 A1 | 3/2007 | Merrill | |
| 2007/0231548 A1 | 10/2007 | Merrill | |
| 2007/0281143 A1 | 12/2007 | Aylward | |
| 2007/0298271 A1 | 12/2007 | Liu | |
| 2008/0020186 A1 | 1/2008 | Hebrink | |
| 2008/0143926 A1 | 6/2008 | Amimori | |
| 2008/0197518 A1 | 8/2008 | Aylward | |
| 2009/0015902 A1* | 1/2009 | Powers | E06B 9/24 359/288 |
| 2009/0159578 A1 | 6/2009 | Lin | |
| 2009/0273836 A1 | 11/2009 | Yust | |
| 2010/0119738 A1 | 5/2010 | Suzuki | |
| 2011/0249331 A1 | 10/2011 | Klippstein | |
| 2011/0249332 A1 | 10/2011 | Merrill | |
| 2011/0249334 A1 | 10/2011 | Merrill | |
| 2011/0255163 A1 | 10/2011 | Merrill | |
| 2011/0255167 A1 | 10/2011 | Merrill | |
| 2011/0286095 A1 | 11/2011 | Merrill | |
| 2013/0094084 A1 | 4/2013 | Merrill | |
| 2013/0094085 A1 | 4/2013 | Merrill | |

(56) References Cited

U.S. PATENT DOCUMENTS

| | | |
|---|---|---|
| 2013/0094088 A1 | 4/2013 | Merrill |
| 2013/0095434 A1 | 4/2013 | Dunn |
| 2013/0095435 A1 | 4/2013 | Dunn |

FOREIGN PATENT DOCUMENTS

| | | |
|---|---|---|
| JP | 2002521728 A | 7/2002 |
| JP | 2004-029285 | 1/2004 |
| WO | WO 1997/32224 | 9/1997 |
| WO | WO 1998/21521 | 5/1998 |
| WO | WO 1999/53242 | 10/1999 |
| WO | WO 00/07043 A1 | 2/2000 |
| WO | WO 2000/07046 | 2/2000 |
| WO | WO 2002/50583 | 6/2002 |
| WO | WO 2003/006261 | 1/2003 |
| WO | WO 2004/003630 | 1/2004 |
| WO | WO 2004/004362 | 1/2004 |
| WO | WO 2007/084000 | 7/2007 |
| WO | WO 2007/117323 | 10/2007 |
| WO | WO 2008/144136 | 11/2008 |
| WO | WO 2008/144656 | 11/2008 |
| WO | WO 2009/116660 | 9/2009 |
| WO | WO 2010/075340 | 7/2010 |
| WO | WO 2010/075357 | 7/2010 |
| WO | WO 2010/075363 | 7/2010 |
| WO | WO 2010/075373 | 7/2010 |
| WO | WO 2010/075383 | 7/2010 |

OTHER PUBLICATIONS

Baba, "Patterned Submicrometer-Thick Optical Polarizing Films Using Stretched Silver Island Multilayers", Micro- and Nanophotonic Materials and Devices, Proceedings of SPIE, Jan. 20, 2000, vol. 3937, pp. 156-163.

Karman, "P-37: Increasing the Viewing Angle of Multidomain LCDs by Using Patterned Retarders", Eurodisplay, 2002, pp. 515-517.

Matharu, "Liquid Crystals for Holographic Optical Data Storage", Chemical Society Reviews, 2007, vol. 36, No. 12, pp. 1868-1880.

Moia, "New Colour Shifting Security Devices", Optical Security and Counterfeit Deterrence Techniques V, Proceedings of SPIE—IS&T Electronic Imaging, SPIE, Jun. 3, 2004, vol. 5310, pp. 312-320.

Ostroverkhova, "Organic Photorefractives: Mechanisms, Materials, and Applications", Chemical Reviews, Jul. 2004, vol. 104, No. 7, pp. 3267-3314.

Roosendaal, "8.1: Novel High Performance Transflective LCD with a Patterned Retarder", SID Symposium Digest of Technical Papers, May 2003, vol. 34, No. 1, pp. 78-81.

Shibaev, "Thermotropic liquid-crystalline polymers: 14.* Thermorecording on liquid-crystalline polymers with the aid of a laser beam", Polymer Communications, Dec. 1983, vol. 24, pp. 364-365.

Stover, Optical Scattering: Measurement and Analysis, Second Edition, SPIE Optical Engineering Press, Bellingham, WA, (1995), Chapter 1, pp. 1-27.

Tsai, "Fabricating Polymeric Micro-retardation Arrays for Autostereoscopic Display System by $CO_2$ Laser Heat Processing Technology", Stereoscopic Displays and Virtual Reality Systems VII, Proceedings of SPIE, May 3, 2000, vol. 3957, pp. 142-152.

Tsai, "Fabricating Microretarders by $CO_2$ Laser Heating Process Technology", Opt. Eng., Nov. 2001, vol. 40, No. 11, pp. 2577-2581.

Van Der Zande, "14.2: Technologies Towards Patterned Optical Foils", SID Symposium Digest of Technical Papers, May 2003, vol. 34, No. 1, pp. 194-197.

Weber, "Giant Birefringent Optics in Multilayer Polymer Mirrors", Science, Mar. 31, 2000, vol. 287, pp. 2451-2456.

International Search Report for PCT/US2011/042358, 4 pages.

"Korean Application Serial No. 10-2013-7002371, Office Action dated Apr. 12, 2017", 4 pgs.

* cited by examiner

DIFFUSE REFLECTIVE OPTICAL FILMS WITH SPATIALLY SELECTIVE BIREFRINGENCE REDUCTION

FIELD OF THE INVENTION

This invention relates generally to optical films, and associated systems and methods.

BACKGROUND

Diffusely reflective polymer-based optical films are known. For example, U.S. Pat. No. 5,825,543 (Ouderkirk et al.) and U.S. Pat. No. 7,057,816 (Allen et al.) describe, among other things, optical films with a disperse phase of polymeric particles disposed within a continuous birefringent matrix of another polymeric material. The films are oriented, typically by stretching, in one or more directions. The size and shape of the disperse phase particles, the volume fraction of the disperse phase, the film thickness, and the amount of orientation are chosen to attain a desired degree of diffuse reflection and total transmission of electromagnetic radiation of a desired wavelength in the resulting film. A substantial mismatch in refractive index between the continuous phase polymer and the disperse phase polymer along a particular axis has the effect that incident light polarized along that axis will be substantially scattered, resulting in a significant amount of reflection. By contrast, incident light polarized along an axis in which the refractive indices of the continuous and disperse phase polymers are substantially matched will be specularly transmitted or reflected with a much lesser degree of scattering. This effect is described in connection with a variety of embodiments, including both diffusely reflective polarizers and diffusely reflective mirrors. For these embodiments, the refractive index mismatch is the predominant factor relied upon to promote scattering. In comparison, the geometry of the particles of the disperse phase is said to have only a secondary effect on scattering.

The '816 Allen et al. patent also describes embodiments in which the first and second polymer materials are morphologically co-continuous.

The '543 Ouderkirk et al. patent describes the addition of dichroic dyes to the diffusely reflective polymer-based blend optical films. Dichroic dyes in combination with certain polymer systems exhibit the ability to polarize light to varying degrees. The dichroic dyes are able to absorb light of a particular polarization when they are molecularly aligned within the material. A higher dichroism ratio indicates a higher ability to polarize light.

U.S. Pat. No. 5,217,794 (Schrenk et al.) describes a lamellar polymeric film made of polymeric inclusions that are large compared with wavelength along two axes, disposed within a continuous matrix of another polymer material. The body thus includes discontinuous layers of at least one polymeric material within a matrix of another polymeric material which polymers differ in refractive index. The resulting multilayered lamellar polymeric body, depending upon the layer thicknesses selected, may reflect substantially white light and exhibit a silvery, metallic appearance, or may have bands of iridescent color.

U.S. Pat. No. 6,096,247 (Ulsh et al.) discusses embossing various types of optical polymer films, including films composed of blends of two or more polymeric materials of the type disclosed in the '543 Ouderkirk et al. patent. The heat source used by Ulsh et al. is said to soften the surface of the optical film rapidly enough to cause softening of the film surface without causing a significant change in the optical properties of the bulk film. In this way, the embossed optical films of Ulsh et al. exhibit reflection, transmission, absorption, and refraction characteristics in the bulk phase that are substantially the same as those exhibited by the optical film prior to embossing.

BRIEF SUMMARY

We describe herein, among other things, methods of internally patterning diffusely reflective optical films that do not require the selective application of pressure, and do not rely on a selective thinning of the film to accomplish the patterning. Thus, in some cases, the internal patterning discussed herein can be accomplished without any selective application of pressure to the film, and/or without any significant thinning of the film. Rather, at least some of the disclosed methods accomplish the patterning by selectively reducing, in a second zone but not in a neighboring first zone, the birefringence of at least one of the polymer materials that are separated into distinct first and second phases in a blended layer of the optical film. In other cases, the internal patterning may be accompanied by a substantial change in thickness, the thickness change being either thicker or thinner depending on processing conditions.

Exemplary diffusely reflective optical films utilize a blended layer in which at least one of the first and second phases is a continuous phase, and the first and/or second polymer material associated with the continuous phase is birefringent in the first zone.

The selective birefringence reduction can be performed by the judicious delivery of an appropriate amount of energy to the second zone so as to selectively heat at least one of the blended polymer materials therein to a temperature high enough to produce a relaxation in the material that reduces or eliminates a preexisting optical birefringence. In some cases, the elevated temperature during heating may be low enough, and/or may persist for a brief enough time period, to maintain the physical integrity of the morphological blend structure within the film. In such cases, the blend morphology of the second zone is substantially unchanged by the selective heat treatment, even though the birefringence is reduced. The reduction in birefringence may be partial or it may be complete, in which case one or more polymer materials that are birefringent in the first zone are rendered optically isotropic in the second zone. In exemplary embodiments, the selective heating is achieved at least in part by selective delivery of light or other radiant energy to the second zone of the film. The light may comprise ultraviolet, visible, or infrared wavelengths, or combinations thereof. At least some of the delivered light is absorbed by the film to provide the desired heating, with the amount of light absorbed being a function of the intensity, duration, and wavelength distribution of the delivered light, and the absorptive properties of the film. Such a technique for internally patterning a blended film is compatible with known high intensity light sources and electronically addressable beam steering systems, thus allowing for the creation of virtually any desired pattern or image in the film by simply steering the light beam appropriately, without the need for dedicated hardware such as image-specific embossing plates or photomasks.

Also discussed is the inclusion of absorbing agents, such as suitably absorbing dyes or pigments, into the disclosed films to selectively capture the radiant energy at a desired wavelength or wavelength band, the radiant energy so delivered to selectively heat the films. When the films are formed by co-extrusion of multiple layers, these absorbing agents may be selectively included in particular layers to control the heating process and thus the through-thickness reduction of birefringence. If multiple blended layers are co-extruded, at least one may include an absorbing agent while at least one may not include an absorbing agent, or substantially every co-extruded blended layer may include an absorbing agent. In other cases, additional layers such as internal facilitation layers and skin layers may be incorporated into the construction.

The present application therefore discloses, inter alia, optical films that include a blended layer extending from a first zone to a second zone of the film. The blended layer may include first and second polymer materials separated into distinct first and second phases, respectively, and the blended layer may have substantially the same composition and thickness in the first and second zones. At least one of the first and second phases may be a continuous phase, and the first and/or second polymer material associated with the continuous phase may be birefringent in the first zone, e.g., it may have a birefringence of at least 0.03, or 0.05, or 0.10 at a wavelength of interest such as 633 nm or another wavelength of interest. The layer may have a first diffusely reflective characteristic in the first zone, and a different second diffusely reflective characteristic in the second zone. The difference between the first and second diffusely reflective characteristic may not be substantially attributable to any difference in composition or thickness of the layer between the first and second zones. Instead, the difference between the first and second diffusely reflective characteristic may be substantially attributable to a difference in birefringence of at least one of the first and second polymer materials between the first and second zones. In some cases, the blended layer may have substantially the same morphology in the first and second zones. For example, the immiscible blend morphology in the first and second zones (e.g. as seen in microphotographs of the blended layer) may differ by no more than a standard variability of the immiscible blend morphology at different places in the first zone due to manufacturing variations.

The first diffusely reflective characteristic, e.g. $R_1$, and the second diffusely reflective characteristic, e.g. $R_2$, are compared under the same illumination and observation conditions. For example, the illumination condition may specify the incident light, e.g., a specified direction, polarization, and wavelength, such as normally incident unpolarized visible light, or normally incident visible light polarized along a particular in-plane direction. The observation condition may specify, for example, hemispheric reflectivity (all light reflected into a hemisphere on the incident light-side of the film). If $R_1$ and $R_2$ are expressed in percentages, $R_2$ may differ from $R_1$ by at least 10%, or by at least 20%, or by at least 30%. As a clarifying example, $R_1$ may be 70%, and $R_2$ may be 60%, 50%, 40%, or less. Alternatively, $R_1$ may be 10%, and $R_2$ may be 20%, 30%, 40%, or more. $R_1$ and $R_2$ may also be compared by taking their ratio. For example, $R_2/R_1$ or its reciprocal may be at least 2, or at least 3.

The first phase may be a dispersed phase, while the second phase may be a continuous phase, e.g., extending through portions of the first and second zones. Alternatively, the first and second phases may be co-continuous phases. The first polymer material may be birefringent in the first zone, and equally birefringent, less birefringent, or isotropic in the second zone. Alternatively, the first polymer material may be isotropic in both the first and second zones. The second polymer material may be birefringent in at least the first zone, and may be equally birefringent, less birefringent, or isotropic in at least the second zone. In any case, at least one of the polymers is preferably less birefringent (including in some cases isotropic) in the second zone relative to the first zone.

The first and/or second diffusely reflective characteristic may be characterized by substantially different reflectivities for normally incident light of different polarizations, in which case the optical film may be or comprise a diffusely reflective polarizer in the first and/or second zones. Furthermore, the first and/or second diffusely reflective characteristic may be characterized by substantially the same reflectivity for normally incident light of different polarizations, in which case the optical film may be or comprise a diffusely reflective mirror in the first and/or second zones. Furthermore, the first and/or second diffusely reflective characteristic may be characterized by high transmission and low haze for normally incident light of different polarizations, in which case the optical film may be or comprise a window-like film in the first and/or second zones.

Also discussed are methods of making internally patterned optical films. Such methods may include providing a film having a blended layer that includes first and second polymer materials separated into distinct first and second phases, respectively, the layer having a first diffusely reflective characteristic in both a first and second zone of the film. At least one of the first and second phases may be a continuous phase, and the first and/or second polymer material associated with the continuous phase may be birefringent in the first zone, e.g., it may have a birefringence of at least 0.03, or 0.05, or 0.10 at a wavelength of interest such as 633 nm or another visible, infrared, or ultraviolet wavelength of interest. The methods may also include selectively heating the film in the second zone in an amount sufficient to cause the second zone to exhibit a second diffusely reflective characteristic different from the first diffusely reflective characteristic, the selective heating being carried out without any substantial modification to outer surfaces of the blended layer. The selective heating may also be carried out without any substantial reduction in thickness of the film in the second zone, and/or without any substantial change in morphology of the blended layer in the second zone. The second diffusely reflective characteristic may scatter light of a given incidence direction and polarization less than, or more than, the first diffusely reflective characteristic.

Such a method may be carried out such that the difference between the first and second diffusely reflective characteristics is substantially attributable to a change in birefringence of at least one of the first and second polymer materials brought about by the selective heating. The second polymer material may be birefringent in the first zone. The first polymer material may also be birefringent in the first zone, and the selective heating may cause the first polymer material to be less birefringent or isotropic in the second zone. Alternatively or in addition, the selective heating may cause the second polymer to be less birefringent or isotropic in the second zone relative to the first zone. The selective heating may include directing radiant energy, such as laser light, at at least a portion of the second zone of the film.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
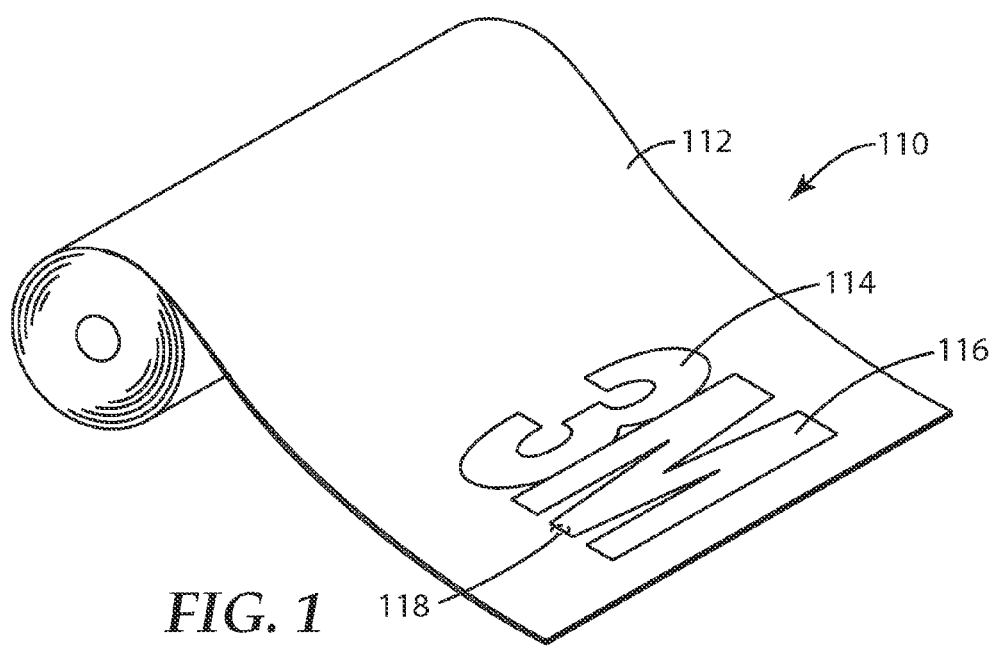
FIG. 1 is a perspective view of a roll of diffusely reflective optical film that has been internally patterned to provide different diffusely reflective characteristics in different portions or zones of the film so as to form indicia.

FIG. 1 depicts a diffusely reflective optical film 110 that has been internally patterned or spatially tailored using spatially selective birefringence reduction of at least one polymer material in a blended layer (not shown in FIG. 1) of the film. The internal patterning defines distinct zones 112, 114, 116 that are shaped so as to form the indicia "3M" as shown. The film 110 is shown as a long flexible material wound into a roll because the methodology described herein is advantageously compatible with high volume roll-to-roll processes. However, the methodology is not limited to flexible roll goods and can be practiced on small piece parts or samples as well as non-flexible films and articles.

The "3M" indicia is visible because the different zones 112, 114, 116 have different diffusely reflective characteristics. In the depicted embodiment, zone 112 has a first diffusely reflective characteristic and zones 114, 116 have a second diffusely reflective characteristic different from the first diffusely reflective characteristic. Typically, but not necessarily, the film 110 will be at least partially light transmissive, in which case the zones 112, 114, 116 will also have different transmissive characteristics that correspond to their respective reflective characteristics. In general, of course, transmission (T) plus reflection (R) plus absorption (A)=100%, or T+R+A=100%. When dealing with films that may appreciably diffusely scatter the transmitted and/or reflected light, we keep in mind that T may represent the hemispheric transmission, i.e., all light that exits the film on a side of the film opposite the light source, regardless of its propagation direction within a solid angle of $2\pi$, and R may likewise represent the hemispheric reflection, i.e., all light that exits the film on the same side of the film as the light source, regardless of its propagation direction within a complementary $2\pi$ solid angle. In some embodiments the film is composed entirely of materials that have low absorption over at least a portion of the wavelength spectrum. This may be the case even for films that incorporate an absorbing dye or pigment to promote heat delivery, since some absorbing materials are wavelength specific in their absorptivity. For example, infrared dyes are available that selectively absorb in the near-infrared wavelength region but that have very little absorption in the visible spectrum. At the other end of the spectrum, many polymer materials that are considered to be low loss in the optical film literature do have low loss over the visible spectrum but also have significant absorption at certain ultraviolet wavelengths. Thus, in many cases the film 110 may have an absorption that is small or negligible over at least a limited portion of the wavelength spectrum, such as the visible spectrum, in which case the reflection and transmission over that limited range take on a complementary relationship because T+R=100%−A, and since A is small, $$T+R\approx 100\%.$$

As will be explained further below, the first and second diffusely reflective characteristics are each the result of structural features that are internal to the film 110, rather than the result of coatings applied to the surface of the film or other surface features. This aspect of the disclosed films makes them advantageous for security applications (e.g. where the film is intended for application to a product, package, or document as an indicator of authenticity) because the interior features are difficult to copy or counterfeit.

The first and second diffusely reflective characteristics differ in some way that is perceptible under at least some viewing conditions to permit detection of the pattern by an observer or by a machine. In some cases it may be desirable to maximize the difference between the first and second reflective characteristics at visible wavelengths so that the pattern is conspicuous to human observers under most viewing and lighting conditions. In other cases it may be desirable to provide only a subtle difference between the first and second diffusely reflective characteristics, or to provide a difference that is conspicuous only under certain viewing conditions. In either case the difference between the first and second diffusely reflective characteristics is preferably attributable primarily to a difference in the refractive index properties of interior features of the optical film in the different neighboring zones of the film, and is not primarily attributable to differences in thickness between the neighboring zones.

The zone-to-zone differences in refractive index can produce various differences between the first and second diffusely reflective characteristics depending on the design of the optical film. In some cases the first characteristic may be or include, for example, a minimum, maximum, or average reflectivity (or transmission) value over the visible wavelength range, or over some other wavelength range of interest, where the reflectivity (or transmission) may be measured for an incident beam of a specified polarization state and for reflected (or transmitted) light within a specified solid angle of reflected (or transmitted) directions relative to the incident beam, or within a hemispheric (2π) solid angle on the incident light-side (or the opposite side) of the film, for example. The second characteristic may differ from the first by having a substantially different (whether greater or lesser) minimum, maximum, or average reflectivity or transmission value for the same specified incident light and measurement conditions as the first characteristic. Furthermore, one of the first and second diffusely reflective characteristics may correspond substantially to a highly transmissive, low scattering appearance as in the case of a window film, at least for incident light of one polarization state.

Thus, for example, the first diffusely reflective characteristic, in zone 112, may have a peak or average reflectivity of $R_1$ in a wavelength range of interest for a specified condition of incident light (e.g. a specified direction, polarization, and wavelength, such as normally incident unpolarized visible light, or normally incident visible light polarized along a particular in-plane direction). The reduced birefringence in the zones 114, 116 yields a second diffusely reflective characteristic, such as a different peak or average reflectivity of $R_2$ in the same wavelength range of interest for the same specified condition of incident light. $R_1$ and $R_2$ are compared under the same illumination and observation conditions, for example, $R_1$ and $R_2$ may be measured as hemispheric reflectivity on the incident light-side of the film, for the specified incident condition. If $R_1$ and $R_2$ are expressed in percentages, $R_2$ may differ from $R_1$ by at least 10%, or by at least 20%, or by at least 30%. As a clarifying example, $R_1$ may be 70%, and $R_2$ may be 60%, 50%, 40%, or less. Alternatively, $R_1$ may be 10%, and $R_2$ may be 20%, 30%, 40%, or more. $R_1$ and $R_2$ may also be compared by taking their ratio. For example, $R_2/R_1$ or its reciprocal may be at least 2, or at least 3.

It may be convenient in some cases to describe the diffusely reflective characteristics with a bidirectional scattering distribution function (BSDF), as described in J. Stover, *Optical Scattering: Measurement and Analysis*, Second Edition (SPIE 1995), which is a function of a polar angle θ normal to film plane, and an azimuthal angle φ measured in a plane of the film. The polar angle thus corresponds to an angle of exitance from the film surface. The azimuthal angle may be described with respect to a known direction in the film plane, e.g. the in-plane direction of maximum or minimum orientation as induced by stretching, a resulting principal direction of the dielectric tensor or refractive index, functionally described by the measurement, e.g. an in-plane axis of maximum or minimum normal back scattering (or maximum block or pass state of a diffuse reflecting polarizer) for normally incident light. The BSDF is also a function of the polarization state of the incident light and the polar angle and azimuthal angles of incidence for a collimated and polarized light source such as a laser. When properly integrated over the solid angle, the total reflectivity R can be derived from the BSDF. Since the diffuse reflective blend construction may also be partially transmissive, a corresponding BSDF can also be measured on the side of the film opposite the source. Proper integration over the solid angle would then derive the total transmission T. The total absorption loss, A, can then be estimated by subtraction from unity in accordance with the preceding discussion.

In some cases the first and second diffusely reflective characteristics may differ in their dependence of reflection or transmission with angle. For example, the first characteristic may have a given minimum, maximum, or average reflectivity or transmission for light of a given polarization state normally incident on the film, and the second characteristic may have the same or similar reflectivity or transmission value for light of the same incidence conditions. With increasing incidence angle, however, the value may increase for the first characteristic and decrease for the second characteristic, or vice versa, or the value may remain relatively constant for one characteristic and substantially increase or decrease for the other. For example, the first and second diffusely reflective characteristic may exhibit the same or similar average reflectivity over visible wavelengths for normally incident light of a given polarization state, but as the incidence angle increases, the average reflectivity of the film in the first zone (corresponding to the first diffusely reflective characteristic) may increase, while the average reflectivity of the film in the second zone (corresponding to the second diffusely reflective characteristic) may decrease, e.g., in a range from normal incidence to the Brewster's angle.

In some cases, the first and second diffusely reflective characteristics may have diffuse reflection or transmission properties that affect different portions of the visible spectrum differently for at least some illumination conditions and observation conditions, and these spectral differences may be perceived by a human observer as differences in color between the first and second zones of the film. For example, a lamellar polymeric film may comprise a birefringent continuous second phase in the first zone and an isotropic continuous phase in the second zone with different iridescences.

Of particular interest to the present disclosure are optical films that exhibit diffuse reflectivity as a substantial result of at least one blended layer. The blended layer is made up of at least two distinct light transmissive polymer materials that immiscibly mingle during film formation to form microscopic structures distributed throughout the volume or interior of the layer. In some cases, a first polymer material may form a discontinuous or disperse phase of light transmissive material in the blended layer, while a second polymer material may form a continuous or matrix phase of light transmissive material in the blended layer. In other cases, the polymer materials may form co-continuous phases of light transmissive materials. Note that although the disperse or co-continuous phase of a blended layer may be repeatedly referred to herein as the "first" phase, and the continuous phase of the blended layer may be repeatedly referred to as the "second" phase, the labels "first" and "second" may, in general, be assigned arbitrarily to any given phase as desired.

First-order reflection and transmission properties of the film are determined by the blend morphology of the different polymer materials within the blended layer, and the relative refractive indices of those materials along principal axes of the film. For example, if the first and second polymer materials have substantially mismatched refractive indices (e.g., the difference may be greater than 0.05, or at least about 0.07, or 0.1, or 0.2) along a given in-plane axis, incident light polarized along that axis may be substantially scattered, resulting in a significant amount of diffuse reflection. By contrast, if the first and second polymer materials have substantially matched refractive indices along a given in-plane axis (e.g., the difference may be less than 0.05, or 0.03, or 0.02, or 0.01), incident light polarized along that axis may be specularly transmitted with a much lesser degree of scattering, including substantially no scattering in some cases. These principles can be exploited to fabricate a wide variety of optical films such as diffusely reflective polarizers, diffusely reflective mirrors, and even high transparency films that may have significant amounts of haze or that may have little or no haze, i.e., films that have a window-like appearance. Control of the match or mismatch of refractive indices along a particular axis is achieved by selection of suitable polymer materials (one, some, or all of which undergo a change in refractive index in response to orientation or stretching), and selection of suitable film processing parameters such as the type of film orientation or stretch (e.g., uniaxial, biaxial, constrained, unconstrained, simultaneous, or sequential), the amount of orientation or stretch along a given axis, and process conditions during orientation or stretch. Additional information relating generally to the design, fabrication, and use of diffusely reflective optical films can be found in one or more of U.S. Pat. No. 5,825,543 (Ouderkirk et al.), U.S. Pat. No. 6,179,948 (Merrill et al.), U.S. Pat. No. 6,673,275 (Allen et al.), and U.S. Pat. No. 7,057,816 (Allen et al.), and U.S. Patent Application Publications US 2004/0164434 (Tabar et al.) and US 2008/0020186 (Hebrink et al.).

Figure 2:
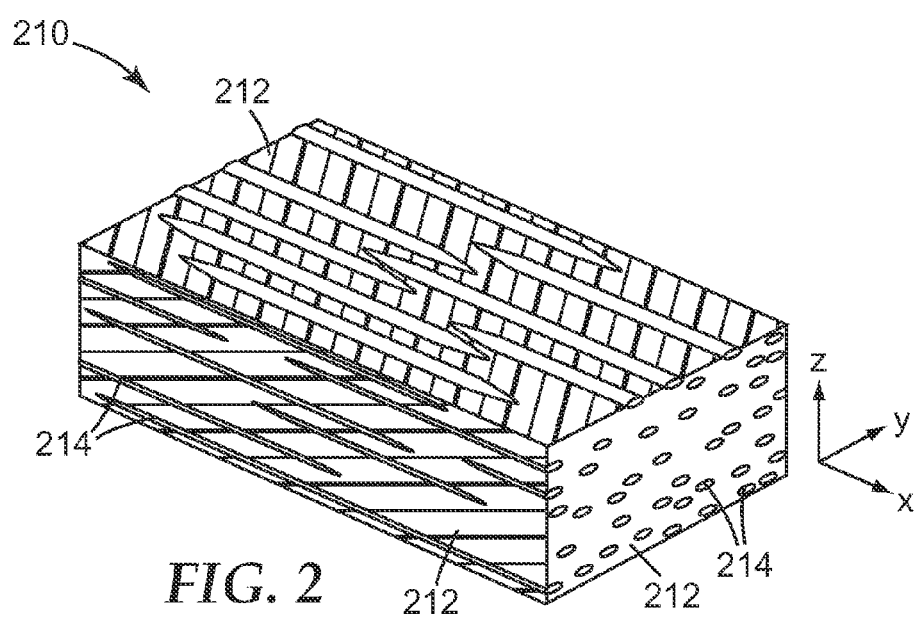
FIG. 2 is a schematic perspective view of a portion of a blended layer of a diffuse optical film.

Turning now to FIG. 2, we see there a portion of a blended layer of a diffusely reflective optical film 210 in schematic perspective view to reveal the interior structure or immiscible blend morphology of the layer/film. We refer to the film as a diffusely reflective optical film even in cases where the film may have a high transparency with little or no haze, i.e., where it has a window-like appearance, so long as such film was derived from, or can be processed into, a film that diffusely reflects or diffusely transmits light of a given incidence direction and polarization state in accordance with the selective heating techniques set forth herein. The film 210 is shown in relation to a local x-y-z Cartesian coordinate system, where the film extends parallel to the x- and y-axes, and the z-axis is perpendicular to the film and parallel to a thickness axis of the film. Note that the film 210 need not be entirely flat, but may be curved or otherwise shaped to deviate from a plane, and even in those cases arbitrarily small portions or regions of the film can be associated with a local Cartesian coordinate system as shown. The film 210 may in general be considered to represent the film 110 of FIG. 1 in any of its zones 112, 114, 116, since the film 110 preferably includes a blended layer that extends continuously from each such zone to the next. As depicted, film 210 includes a first light-transmissive polymer or other material which is in the form of a continuous or matrix phase 212, and a second light-transmissive polymer or other material which is in the form of a discontinuous or disperse phase 214.

Many different materials may be used to fabricate the disclosed optical films, depending on the specific application to which the optical film is directed. Such materials may include inorganic materials such as silicon-based polymers, organic materials such as liquid crystals, and polymeric materials, including monomers, copolymers, grafted polymers, and mixtures or blends thereof. The exact choice of materials for a given application will be driven by the desired match and/or mismatch obtainable in the refractive indices of the different phases along a particular axis, as well as the desired physical properties in the resulting product. In cases where one of the materials is present in the blended layer in a continuous phase, such material will generally be characterized by being substantially transparent in the region of the spectrum desired, and such material desirably exhibits birefringence at least prior to the selective heat treatment discussed herein.

At least some of the diffusely reflective films disclosed herein, and/or the blended layers thereof, may be composed substantially entirely of polymeric materials, although in some cases non-polymeric materials may also be used. In some cases, only two different polymeric materials may be used, but in other cases more than two such polymeric materials may be used.

In general, the class of optical films formed with co-extrudable blends of thermoplastics is of particular interest. With these systems, films may be formed, oriented by one or more stretching processes, and wound into roll stock for later use. The stretching process thereby imparts the birefringence in at least one continuous phase. Thermoplastics provide distinct advantages over systems comprising thermosets that must be cured prior to winding into a roll. For example, thermoplastics may allow post-processing shaping, e.g. through thermoforming methods. Particularly useful thermoplastics include semicrystalline polymers that include microcrystalline domains of three-dimensional ordered crystalline unit cells. Amorphous thermoplastics are also useful. The rolls may also be treated later for spatial patterning. Some suitable materials for use are discussed, for example in U.S. Pat. No. 5,882,774 (Ouderkirk et al.), U.S. Pat. No. 6,179,948 (Merrill et al.), U.S. Pat. No. 6,673,275 (Allen et al.), U.S. Pat. No. 7,057,816 (Allen et al.), as well as U.S. Patent Application Publications US 2004/0164434 (Tabar et al.) and US 2008/0020186 (Hebrink et al.). With regard to the continuous phase, birefringent in at least the first zone, the various polyesters and their co-polymers described in these references, including in particular polyethylene terephthalate (PET), polyethylene naphthalate (PEN), and copolymers of PEN and PET, are particularly useful, especially the so-called "coPENs." With regard to the at least one other phase, whether dispersed or co-continuous, the polystyrenes, polyacrylates, and polycarbonates described in these references are particularly useful.

A further consideration in the choice of materials is that the resulting product desirably contains at least two distinct phases in order to form the microscopic structures within the blended layer that can provide the desired scattering. This may be accomplished by casting the optical material from two or more materials which are immiscible with each other. Alternatively, if it is desired to make an optical material with a first and second material which are not immiscible with each other, and if the first material has a higher melting point than the second material, in some cases it may be possible to embed particles of appropriate dimensions of the first material within a molten matrix of the second material at a temperature below the melting point of the first material. The resulting mixture can then be cast into a film, with subsequent and/or simultaneous orientation, to produce an oriented optical film or body. In another variation, immiscible materials that react, e.g. by transesterfication, can be used to form the distinct phases, if the extrusion processing times are short enough and the temperatures low enough to maintain immiscible blocks. In still another variation, a third component, e.g. another polymer such as a block co-polymer, or a so-called "compatiblizer", can be added to help control the interfacial tension or other characteristics and thus also the size and shape distributions of the blended phases.

The materials selected for use in the disclosed films, and the degree of orientation of these materials, may in some cases be chosen so that the different materials in the blended layer of the finished film, whether in a heat-treated zone thereof or in a zone that has not been heat treated, have at least one axis for which the associated indices of refraction are substantially equal. The match of refractive indices associated with that axis, which typically, but not necessarily, is an axis transverse to the direction of orientation, results in substantially no reflection of light in that plane of polarization.

At least a first material (e.g. in the form of a disperse phase) may exhibit a decrease in the refractive index associated with the direction of orientation after stretching. If a second material (e.g. in the form of a continuous phase) is positive, a negative strain induced birefringence of the first material has the advantage of increasing the difference between indices of refraction of the adjoining phases associated with the orientation axis while the reflection of light with its plane of polarization perpendicular to the orientation direction may still be negligible. If a reflective polarizer is desired, differences between the indices of refraction of adjoining phases in the in-plane direction orthogonal to the orientation direction should be less than about 0.05 after orientation, and preferably, less than about 0.02, in the wavelength band of interest, such as the visible.

The material in the form of a disperse phase may also exhibit a positive strain-induced birefringence. However, this can be altered by means of heat treatment to match the refractive index of the axis perpendicular to the orientation direction of the other material (e.g. in the form of a continuous phase). The temperature of the heat treatment should not be so high as to relax the birefringence in the continuous phase.

The size of the structures or features in the disperse phase also can have a significant effect on scattering. If the disperse phase particles are too small (e.g., less than about $\frac{1}{30}$ the wavelength of light in the medium of interest) and if there are many particles per cubic wavelength, the optical body may behave as a medium with an effective index of refraction somewhat between the indices of the two phases along any given axis. In such a case, very little light is scattered. If the particles are very large, the number of particles that can be accommodated per unit volume of the blended layer becomes low, and light may be specularly reflected from the surface of the particle, with very little diffusion or scattering into other directions. If such very large particles become disk-shaped or flattened along the x- and y-directions, iridescence effects (which may or may not be desirable) may occur. Practical limits may also be reached when particles become large in that the thickness of the optical body becomes greater and desirable mechanical properties are compromised.

The dimensions of the particles of the disperse phase after alignment can be tailored depending on the desired use of the optical material. Thus, for example, the dimensions of the particles may be tailored depending on the wavelength of electromagnetic radiation that is of interest in a particular application, with different dimensions required for reflecting or transmitting visible, ultraviolet, infrared, and microwave radiation. Generally, however, the length of the particles should be such that they are approximately greater than the wavelength of electromagnetic radiation of interest in the medium, divided by 30.

In applications where the optical body is to be used as a low loss reflective polarizer, the particles may have a length that is greater than about 2 times the wavelength of the electromagnetic radiation over the wavelength range of interest, and preferably over 4 times the wavelength. The average diameter of the particles may be equal to or less than the wavelength of the electromagnetic radiation over the wavelength range of interest, and preferably less than 0.5 of the desired wavelength. While the dimensions of the disperse phase are a secondary consideration in most applications, they become of greater importance in thin film applications, where there is comparatively little diffuse reflection.

While in many cases the refractive index mismatch may be the predominant factor relied upon to promote scattering (e.g., a diffuse mirror or polarizer film may have a substantial mismatch in the indices of refraction of the continuous and disperse phases along at least one in-plane axis), changes to the geometry of the particles of the disperse phase may also have an effect (e.g. a secondary effect) on scattering. Thus, the depolarization factors of the particles for the electric field in the index of refraction match and mismatch directions can reduce or enhance the amount of scattering in a given direction. For example, when the disperse phase is elliptical in a cross-section taken along a plane perpendicular to the axis of orientation (see e.g. disperse phase 214 in FIG. 2), the elliptical cross-sectional shape of the disperse phase can contribute to asymmetric diffusion in both back-scattered light and forward-scattered light. The effect can either add to or detract from the amount of scattering caused by the refractive index mismatch, but typically has a relatively small influence on scattering.

The shape of the disperse phase particles can also influence the degree of diffusion of light scattered from the particles. This shape effect is typically small but increases as the aspect ratio of the geometrical cross-section of the particle in the plane perpendicular to the direction of incidence of the light increases and as the particles get relatively larger. It is often desirable for the disperse phase particles to be sized less than several wavelengths of light in one or two mutually orthogonal dimensions if diffuse, rather than specular, reflection is desired.

Figure 2A:
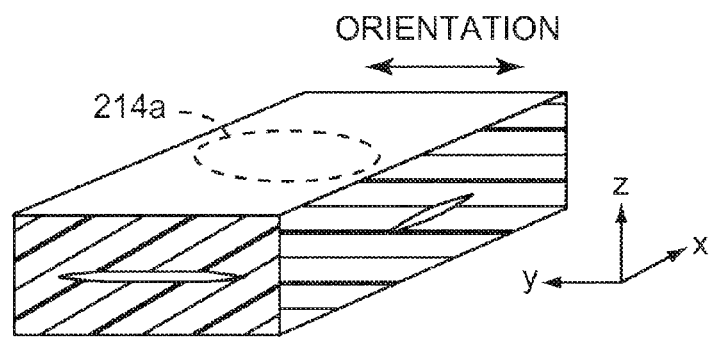
FIGS. 2A-C are schematic perspective views of a portion of a blended layer, illustrating various shapes of the disperse phase in a blended layer.
Figure 2B:
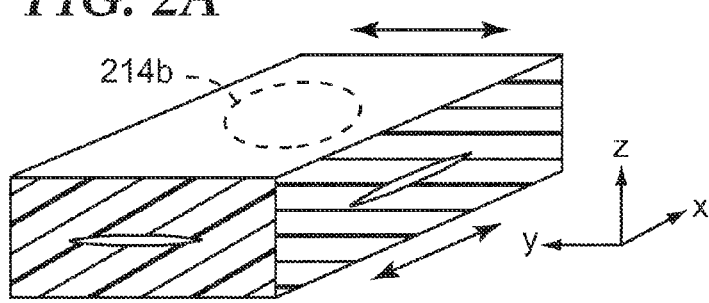
Figure 2C:
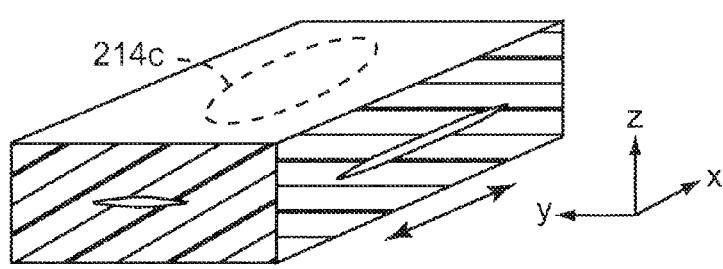

For a low loss reflective polarizer, the film may consist of a disperse phase disposed within the continuous phase as a series of rod-like structures which, as a consequence of orientation, have a high aspect ratio which can enhance reflection for polarizations parallel to the orientation direction by increasing the scattering strength and dispersion for that polarization relative to polarizations perpendicular to the orientation direction. However, the particles or structures of the disperse phase may be provided with many different geometries. Thus, the disperse phase may be disk-shaped or elongated disk-shaped, as in FIGS. 2A-C, or rod-shaped, or spherical. In FIG. 2A, the depicted disperse phase particle 214a is a disk as a result of the film being significantly oriented or stretched in both the x- and y-directions, but the disk is elongated along the y-direction due to a greater degree of orientation in that direction. In FIG. 2B, the depicted disperse phase particle 214b is a disk as a result of the film being significantly oriented or stretched in both the x- and y-directions, and the disk is substantially symmetrical due to approximately equal degrees of orientation in the x- and y-directions. In FIG. 2C, the depicted disperse phase particle 214c is a disk as a result of the film being significantly oriented or stretched in both the x- and y-directions, but the disk is elongated along the x-direction due to a greater degree of orientation in that direction. Other embodiments are contemplated wherein the disperse phase has cross sections which are approximately elliptical (including circular), polygonal, irregular, or a combination of one or more of these shapes. The cross-sectional shape and size of the particles of the disperse phase may also vary from one particle to another, or from one region of the film to another (i.e., as a function of depth from the surface to the core).

Figure 2D:
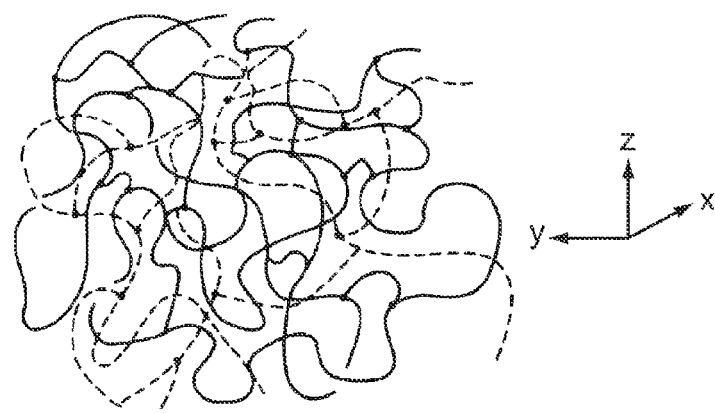
FIG. 2D is a schematic diagram of an interpenetrating polymer network (IPN), which may exist in some embodiments of a blended layer.

Besides a continuous/disperse phase combination, the different polymers that make up the blended layer of the diffusely reflective film may alternatively be arranged in a co-continuous phase relationship. Further details of co-continuous phase constructions can be found e.g. in U.S. Pat. No. 7,057,816 (Allen et al.). FIG. 2D depicts a co-continuous phase construction in which the two phases, one shown in solid lines and the other shown in broken lines, are fibrillar and form an interpenetrating polymer network (IPN). The fibers may be randomly oriented, or oriented along a given axis. Other co-continuous systems may comprise an open-celled matrix of a first material (first phase), with a second material disposed in a co-continuous manner (second phase) within the cells of the matrix.

The different materials used in the different phases of the diffusely reflective optical films have different refractive indices along a particular direction or axis, whether in a heat-treated zone thereof or in a zone that has not been heat treated, so that some light polarized along such direction or axis is reflected at interfaces between the adjacent phases, and collectively scattered. Due to dispersion effects, the refractive indices (and birefringence) of a material are typically measured at a convenient wavelength in a wavelength range of interest, for example, 633 nm when dealing with the visible wavelength range, or an infrared wavelength or an ultraviolet wavelength when dealing with an infrared band or an ultraviolet band, respectively. We may refer to the refractive indices of a first material in the blended layer (e.g., in FIG. 2, the first light-transmissive polymer in the form of continuous phase 212) for light polarized along principal x-, y-, and z-axes as $n1x$, $n1y$, and $n1z$, respectively. The x-, y-, and z-axes may, for example, correspond to the principal directions of the dielectric tensor of the material. Typically, and for discussion purposes, the principal directions of the different materials in the blended layer are coincident, but this need not be the case in general. We refer to the refractive indices of a second material (adjacent the first material) in the blended layer (e.g., in FIG. 2, the second light-transmissive polymer or other material which is in the form of a discontinuous or disperse phase 214) along the same axes as $n2x$, $n2y$, $n2z$, respectively. We refer then to differences in refractive index between these materials or phases as $\Delta nx$ ($=n1x-n2x$) along the x-direction, $\Delta ny$ ($=n1y-n2y$) along the y-direction, and $\Delta nz$ ($=n1z-n2z$) along the z-direction. The nature of these refractive index differences, in combination with the thickness, composition (e.g. volume fraction of the first and second materials in the blended layer), and immiscible blend morphology (e.g., the size, shape, and distribution of structures of the first polymer and structures of the second polymer in the blended layer) of the blended layer, controls the reflective and transmissive characteristics of the such layer, in a given zone. For example, if adjacent phases have a large refractive index mismatch along one in-plane direction ($\Delta nx$ large) and a small refractive index mismatch along the orthogonal in-plane direction ($\Delta ny \approx 0$), the film or blended layer may behave as a diffusely reflective polarizer for normally incident light. In this regard, a diffusely reflective polarizer may be considered for purposes of this application to be an optical body that strongly diffusely reflects normally incident light that is polarized along one in-plane axis (referred to as the "block axis"), and strongly transmits such light that is polarized along an orthogonal in-plane axis (referred to as the "pass axis"). "Strongly reflects" and "strongly transmits" may have different meanings depending on the intended application or field of use, but in many cases a diffusely reflective polarizer will have at least 70, 85, 90, or 95% reflectivity for the block axis, and at least 70, 80, or 85% transmission for the pass axis. These reflectivity and transmission values are assumed to include the effects of Fresnel reflection at the outer surfaces (air/polymer interfaces) of the film.

For purposes of the present application, a material is considered to be "birefringent" if the material has an anisotropic dielectric tensor over a wavelength range of interest, e.g., a selected wavelength or band in the UV, visible, and/or infrared portions of the spectrum. Stated differently, a material is considered to be "birefringent" if the principal refractive indices of the material (e.g., $n1x$, $n1y$, $n1z$) are not all the same. The "birefringence" of a given material or layer may then refer to the difference between its maximum principal refractive index and its minimum principal refractive index, unless otherwise indicated. Negligible amounts of birefringence can generally be ignored. In the case of a blended layer for a diffusely reflective film, a constituent material in the continuous phase preferably exhibits a birefringence of at least 0.03, or 0.05, or 0.10. In some cases, the birefringence of any given material or layer may be specified to be at least 0.02, or 0.03, or 0.05, for example.

In another example, adjacent phases may have a large refractive index mismatch along both in-plane axes ($\Delta nx$ large and $\Delta ny$ large), in which case the film or blended layer may behave as an on-axis diffuse mirror. In this regard, a diffuse mirror or mirror-like film may be considered for purposes of this application to be an optical body that strongly diffusely reflects normally incident light of any polarization. Again, "strongly diffusely reflecting" may have different meanings depending on the intended application or field of use, but in many cases a diffuse mirror will have at least 70, 80, or 90% reflectivity for normally incident light of any polarization at the wavelength of interest.

In variations of the foregoing embodiments, the adjacent phases may exhibit a refractive index match or mismatch along the z-axis ($\Delta nz \approx 0$ or $\Delta nz$ large), and the mismatch may be of the same or opposite polarity or sign as the in-plane refractive index mismatch(es). Such tailoring of $\Delta nz$ plays a key role in whether the reflectivity of the p-polarized component of obliquely incident light increases, decreases, or remains the same with increasing incidence angle. In yet another example, adjacent phases may have a substantial refractive index match along both in-plane axes ($\Delta nx \approx \Delta ny \approx 0$) but a refractive index mismatch along the z-axis ($\Delta nz$ large), in which case the film or layer may behave as a so-called "p-polarizer", strongly transmitting normally incident light of any polarization, but increasingly reflecting p-polarized light of increasing incidence angle.

There are a large number of permutations of possible refractive index differences between adjacent phases along the different axes, possible thicknesses of the blended layer, possible compositions of the blended layer, and possible morphologies of the blended layer. Hence, the variety of possible diffusely reflective films and blended layers thereof is vast. Exemplary diffusely reflective optical films that comprise at least one blended layer are disclosed in U.S. Pat. No. 5,825,543 (Ouderkirk et al.), U.S. Pat. No. 6,179,948 (Merrill et al.), and U.S. Pat. No. 7,057,816 (Allen et al.).

At least one of the materials that form one of the phases in the blended layer of the optical film is birefringent in at least one zone of the film (e.g., zones 112, 114, 116 of FIG. 1). Thus, a first phase in the blended layer may be birefringent (i.e., $n1x \neq n1y$, or $n1x \neq n1z$, or $n1y \neq n1z$), or a second phase in the blended layer may be birefringent (i.e., $n2x \neq n2y$, or $n2x \neq n2z$, or $n2y \neq n2z$), or both the first and second phases may be birefringent. Moreover, the birefringence of one or more such phases is diminished in at least one zone relative to a neighboring zone. In some cases, the birefringence of these phase(s) may be diminished to zero, such that it or they are optically isotropic (i.e., $n1x=n1y=n1z$, or $n2x=n2y=n2z$) in one of the zones but birefringent in a neighboring zone. In cases where both phases are initially birefringent, depending on materials selection and processing conditions, they can be processed in such a way that the birefringence of only one of the phases is substantially diminished, or the birefringence of both phases may be diminished.

Exemplary diffusely reflective optical films are composed of thermoplastic polymer materials and may be fabricated using a variety of flow processes, including co-extrusion, film casting, and film stretching or drawing processes. Typically, birefringence is developed in at least one continuous phase of these materials through one or more of these various flow processes. Reference is made to U.S. Pat. No. 6,179,949 (Merrill et al.) "Optical Film and Process for Manufacture Thereof". The optical film may be formed by co-extrusion of the polymers as described in any of the aforementioned references. For example, the polymers may be dried prior to processing to reduce degradation, fed simultaneously, in measured proportions, into an extruder (of either single screw or twin screw configuration with or without applied vacuum) through a melt train with appropriate filters as desired, spread in a die manifold and exited through a die orifice onto a quench wheel or into a quenching nip roll system. The polymers of the various layers may be chosen to have rheological properties, e.g., melt viscosities, so that the scale of the phases is adequately through the action of the flow. For example, increasing the ratio of a continuous phase viscosity to a dispersed phase viscosity can increase the elongation and break-up of the dispersed phase into smaller droplets. An additional compatibilizer or stabilizing component may be added to reduce the interfacial tensions between the respect phases, thereby reducing the surface tension driven tendency of the droplets to snap back into more spherical shapes or to re-aggregate or flocculate back into larger particles. Extrusion conditions, including temperature, screw speeds, gear pump rates, etc., are chosen to adequately feed, melt, mix, and pump the polymers in a continuous and stable manner. Temperatures used to form and maintain the melt stream may be chosen to be within a range that avoids freezing, crystallization, or unduly high pressure drops at the low end of the temperature range, and that avoids material degradation at the high end of the range. High shear rates may be found particularly advantageous in processing in order to create fine-scale phase structures. In many cases, an increasing gradient in the scale of the phase structure may be found through the thickness of the blend layer due to the decreasing shear field from the melt stream, e.g. die, walls to the flow stream center. Extensional flows can influence the phase sizes and shapes (blend morphology).

In many instances, a co-extrusion of multiple layers is desirable. For example, optically transparent, interior facilitation layers (e.g. a core layer, or set of layers) or outer skin layers, may be used, e.g. as described in U.S. Pat. No. 6,179,948 (Merrill et al.). Blend layers may also comprise layers of a multilayer construction, e.g. formed using processing methods described in U.S. Pat. No. 6,830,713 (Hebrink et al.). In some instances, the various alternating layers may comprise similar blend materials. In other instances, facilitation and blend layers may alternate.

The film may then be formed, e.g. casting from a drop die onto a quenching wheel, e.g with electro-static pinning or between quenched nip rolls, etc. to form the film, or the film can be formed onto a belt with a slot die and quenched. As described in U.S. Patent Application Publication US 2008/0020186 (Hebrink et al.), the film may be partially oriented, e.g. by calendering, in the process of film forming. In some cases, a rolling bank configuration may be used with a calendering process to further affect the phase sizes and shapes. In general, the rate of quenching and the nature of the heat transfer from the outer film surfaces can impact the resulting blend morphology of the formed film.

After cooling, the web can be drawn or stretched to produce the near finished optical film, details of which can be found in the references cited above. The drawing or stretching accomplishes two goals: it further orients and elongates the phases of the blend, and it orients and imparts birefringence to at least one phase in at least one blended layer. Typically, at least one continuous phase acquires birefringence in this manner, although birefringence can also be imparted, in some cases, during the film forming step as previously described. The orientation or stretching can be accomplished along the crossweb direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. The various stretching steps may also affect the phases differently, e.g. as further described in U.S. Pat. No. 6,179,948 (Merrill et al.). Alternatively, the film may be stretched in a batch process. In any case, subsequent or concurrent draw reduction, stress or strain equilibration, heat setting, and other processing operations can also be applied to the film.

The diffusely reflective optical films and film bodies can also include additional layers and coatings selected for their optical, mechanical, and/or chemical properties. For example, a UV absorbing layer can be added at one or both major outer surfaces of the film to protect the film from long-term degradation caused by UV light. Additional layers and coatings can also include scratch resistant layers, tear resistant layers, and stiffening agents. See, e.g., U.S. Pat. No. 6,368,699 (Gilbert et al.).

In some cases, the natural or inherent absorptivity of one, some, or all of the constituent polymer materials that make up the diffusely reflective optical film may be utilized for the absorptive heating procedure. For example, many polymers that are low loss over the visible region have substantially higher absorptivity at certain ultraviolet wavelengths. Exposing portions of the film to light of such wavelengths may be used to selectively heat such portions of the film. In other cases, absorbing dyes, pigments, or other agents can be incorporated into some or all of the individual layers of the optical film to promote absorptive heating as mentioned above. In some cases, such absorbing agents are spectrally selective, whereby they absorb in one wavelength region but not in another. For example, some of the disclosed films may be intended for use in the visible region, such as with anti-counterfeiting security labels or as a component of a liquid crystal display (LCD) device or other display device, in which case an absorbing agent that absorbs at infrared or ultraviolet wavelengths but not substantially at visible wavelengths may be used. Further, an absorbing agent may be incorporated into one or more selected layers or materials of a film. For example, the film may comprise two distinct blended layers separated by an optically thick intermediate layer such as a laminating adhesive layer, one or more skin layers, or the like, and an absorbing agent may be incorporated into one of the blended layers and not the other, or may be incorporated into both blended layers but at a higher concentration in one relative to the other. In another variation, blended layers may be co-extruded through a multilayer feedblock. One blend melt stream may include an absorbing agent, while the other blend melt stream may be identical except that the absorbing agent is absent. In one particular case, the outer layers in the feedblock, the so-called PBLs, are fed by the melt stream without the absorbing agent.

A variety of absorbing agents can be used. For optical films operating in the visible spectrum, dyes, pigments, or other additives that absorb in the ultraviolet and infrared (including near infrared) regions may be used. In some cases it may be advantageous to select an agent that absorbs in a spectral range for which the polymer materials of the film have a substantially lower absorption. By incorporating such an absorbing agent into selected layers or materials of a diffusely reflective optical film, directed radiation can preferentially deliver heat to the selected layers rather than throughout the entire thickness of the film. Exemplary absorbing agents may be melt extrudable so that they can be embedded into a selected material or phase of interest. To this end, the absorbers are preferably reasonably stable at the processing temperatures and residence times required for extrusion.

A variety of melt-extrudable absorbing additives are available from a variety of sources. The additives may be organic, inorganic, or a hybrid. They may be dyes, pigments, nano-particles, or the like. Some potential IR dyes include any of the Nickel, Palladium, and Platinum-based dyes available from Epolin, Inc. under the tradename Epolight™. Other suitable candidates include Amaplast™-brand dyes, available from ColorChem International Corp., Atlanta, Ga. Both linear and non-linear absorbing additives may be considered. For other potential absorbing agents, reference is made to U.S. Pat. No. 6,207,260 (Wheatley et al.) "Multicomponent Optical Body". In many cases, dichroism may hinder the use of the absorbing agent. When the diffusely reflective optical film has an axis of maximum transmission, it may be useful to radiantly process the film with polarized light along that axis. If dichroism aligns the absorption axis along the orientation axis, and that orientation axis is the axis of maximum reflection, then dichroism reduces the absorption strength of the absorbing agent. Non-dichroic, or weakly dichroic absorbing agents are then desired. On the other hand, dichroism that improves absorption along the axis of maximum transmission, e.g. the pass state of a diffusely reflective polarizer, would increase the effectiveness of the absorbing agent.

Figure 3:
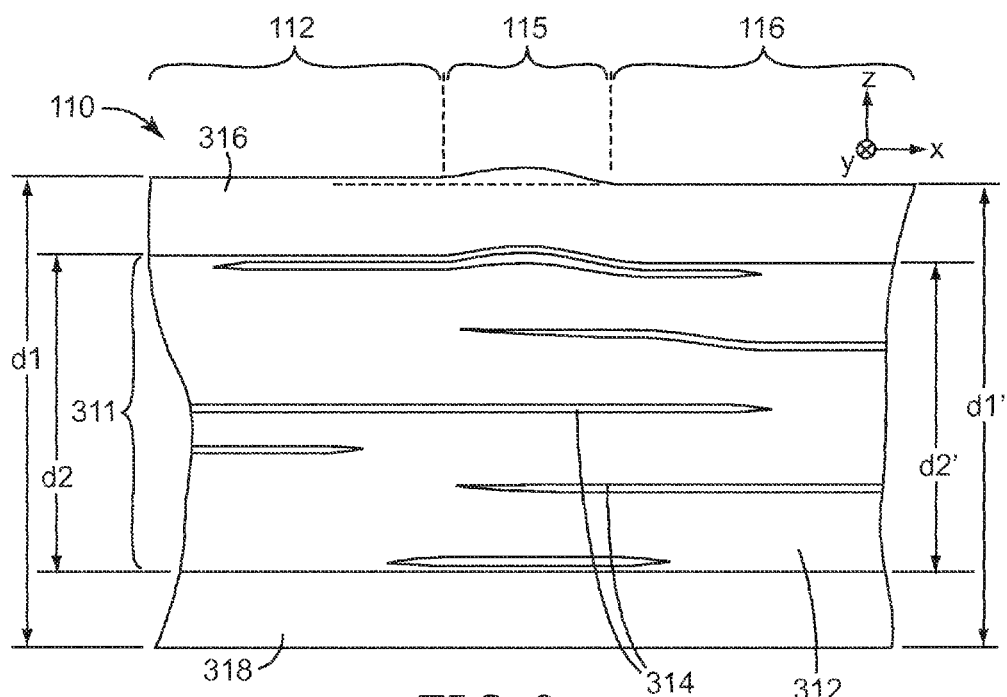
FIG. 3 is a schematic sectional view of a portion of the diffusely reflective film of FIG. 1.

We turn now to FIG. 3, which shows a schematic sectional view of a portion of the diffusely reflective optical film 110 of FIG. 1 in the vicinity of area 118 at a boundary of zone 112 and zone 116. In this expanded view of the film 110, a narrow transition zone 115 can be seen separating the zone 112 from the neighboring zone 116. Such a transition zone may or may not be present depending on processing details, and if it is not present then zone 116 may be immediately adjacent to zone 112 with no significant intervening features. Construction details of film 110 can also be seen: the film includes optional light-transmissive layers 316, 318 on opposite sides thereof, with a blended layer 311 disposed between the layers 316, 318. All portions of the blended layer 311 are interior to the film 110 by virtue of the outer layers. However, if one or both of the layers 316, 318 are omitted, all interior portions of blended layer 311 (i.e., excluding one or both of the outer major surfaces of the layer 311) will still be interior to the film 110. In any case, the blended layer 311 preferably comprises at least two (and in some cases exactly two) different polymer materials arranged into at least two distinct phases throughout the volume of the layer, the blended layer 311 extending continuously in a lateral or transverse fashion from the zone 112 to the neighboring zone 116 as shown, even though particles or other bounded portions of a given phase may be localized in only one of the zones and not extend from one zone to the next. The layer 311 thus includes a first light-transmissive polymer or other material which is in the form of a continuous or matrix phase 312, and a second light-transmissive polymer or other material which is in the form of a discontinuous or disperse phase 314. At least one of the first and second materials is birefringent in the zone 112. The combination of the first and second materials in their respective first and second phases provides a first diffusely reflective characteristic in the zone 112 by scattering of light at the boundaries of the various phases. The zones 115, 116 may have previously had the same diffusely reflective characteristics as zone 112, but have been processed by the selective application of heat thereto in an amount sufficient to reduce or eliminate the birefringence of at least one of the first and second materials in the zone 116 while maintaining its or their birefringence in zone 112. In some cases, the heat may also be low enough to maintain the structural integrity of the blended layer, i.e., of the blend morphology of the first and second materials throughout the volume of the blended layer, in the treated zone 116. The reduced birefringence of the material(s) in the zone 116 may be primarily responsible for a second diffusely reflective characteristic for the zone 116 that is different from the first diffusely reflective characteristic for the zone 112.

The film 110 has characteristic thicknesses d1, d2 in zone 112, and characteristic thicknesses d1', d2' in zone 116, as shown in the figure. The thicknesses d1, d1' are physical thicknesses measured from a front outer surface of the film to a rear outer surface of the film in the respective zones. The thicknesses d2, d2' are physical thicknesses measured from the outer major surface of blended layer 311 that is disposed nearest the front surface of the film to the opposite major surface of blended layer 311 that is disposed nearest the rear surface of the film. Thus, if one wishes to compare the thickness of the film 110 in zone 112 with the thickness of the film in zone 116, one may choose to compare d1 to d1', or d2 to d2', depending on which measurement is more convenient. In most cases the comparison between d1 and d1' may well yield substantially the same result (proportionally) as the comparison between d2 and d2'. (Of course, in cases where the outer layers 316, 318 are omitted, d1 and d2 become the same.) However, where a significant discrepancy exists, such as where one or both layers 316, 318 experiences a significant thickness change from one place to another but no corresponding thickness change exists in the underlying blended layer, or vice versa, then it may be desirable to use the d2 and d2' parameters as being more representative of the overall film thickness in the different zones, particularly in cases where the outer layers 316, 318 have a minor effect on the diffusely reflective characteristics of the film compared to the blended layer.

Of course, for optical films containing two or more distinct blended layers, the thickness of any given blended layer can also be measured and characterized as the distance along the z-axis from the back to the front major surface of such layer. This information may become significant in a more in-depth analysis that compares the physical characteristics of the film 110 in the different zones 112, 116.

As mentioned, the zone 116 has been treated with the selective application of heat to cause at least material or phase in the blended layer 311 to lose some or all of its birefringence relative to its birefringence in neighboring zone 112, such that zone 116 exhibits a diffusely reflective characteristic, resulting from light scattering at interfaces between different phases of the blended layer, that differs from a diffusely reflective characteristic of zone 112. The selective heating process may involve no selective application of pressure to zone 116, and it may result in substantially no thickness change (whether using the parameters d1/d1' or the parameters d2/d2') to the film. For example, the film 110 may exhibit an average thickness in zone 116 that deviates from an average thickness in zone 112 by no more than the normal variability in thickness that one observes in the zone 112, or in the untreated film. Thus, the film 110 may exhibit in zone 112, or over an area of the film encompassing a portion of zone 112 and zone 116 before the heat treatment of zone 116, a variability in thickness (whether d1 or d2) of Δd, and the zone 116 may have spatially averaged thicknesses d1', d2' which differ from spatially averaged thicknesses d1, d2 (respectively) in zone 112 by no more than Δd. The parameter Δd may represent, for example, one, two, or three standard deviations in the spatial distribution of the thickness d1 or d2.

In some cases, the heat treatment of zone 116 may give rise to certain changes to the thickness of the film in zone 116. These thickness changes may result from, for example, local shrinkage and/or expansion of the different materials that constitute the optical film 110, or may result from some other thermally-induced phenomenon. However, such thickness changes, if they occur, play only a secondary role in their effect on the diffusely reflective characteristic of the treated zone 116 compared to the primary role played by the reduction or elimination of birefringence in the treated zone. Note also that in many cases it may be desirable to hold the film by its edges under tension during the selective heat treatment that accomplishes the internal patterning, in order to avoid wrinkling of the film, or for other reasons. The amount of tension applied and details of the heat treatment may also result in some amount of thickness change in the treated zones.

As discussed elsewhere, in some cases the thickness of the film 110 in the treated zone 116, i.e., d1' or d2', may differ somewhat from the thickness of the film in the untreated zone 112, even if no selective pressure was in fact applied to the zone 116 during heat treatment. For this reason, FIG. 3 depicts d1' as being slightly different from 30 d1, and d2' as being slightly different from d2. A transition zone 115 is also shown for generality, to show that a "bump" or other detectable artifact may exist on the outer surface of the film as a consequence of the selective heat treatment. In some cases, however, the treatment may result in no detectable artifact between the neighboring treated and untreated zones. For example, in some cases an observer who slides his or her finger across the boundary between the zones may detect no bump, ridge, or other physical artifact between the zones.

Under some circumstances it may be possible for thickness differences between treated and untreated zones to be non-proportional through the thickness of the optical film. For example, in some cases it is possible for an outer skin layer to have a relatively small thickness difference, expressed as a percentage change, between the treated and untreated zones, while one or more internal blended layers may have a larger thickness difference, also expressed as a percentage change, between the same zones.

Figure 4:
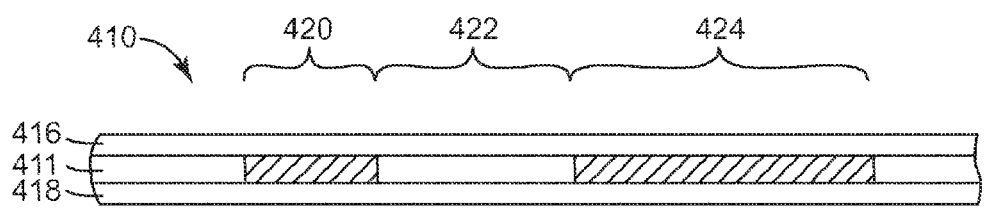
FIG. 4 is a schematic sectional view of a portion of another diffusely reflective film with internal patterning.

FIG. 4 shows a schematic sectional view of a portion of another diffusely reflective optical film 410 that incorporates internal patterning. Film 410 comprises outer optically thick skin layers 416, 418, and a central blended layer 411 sandwiched between the skin layers. All portions of the blended layer are internal to the film 410. (In alternative embodiments, one or both skin layers may be omitted, in which case one or both major surfaces of the blended layer may become exposed to an air medium.) The blended layer 411 includes at least a first and second distinct material distributed throughout the layer 411 in distinct first and second phases (e.g., a continuous and disperse phase, or co-continuous phases), and at least one of the first and second materials or phases is birefringent in at least some zones or areas of the film. The distinct phases in the blended layer provide a first diffusely reflective characteristic at least in a first untreated zone 422 of the film. The film 410 has been selectively heated in the neighboring zones 420, 424, without applying any pressure selectively to these zones, so as to provide a second diffusely reflective characteristic also associated light scattered from the distinct phases in the interior of the blended layer, but that differs from the first diffusely reflective characteristic. These differences in diffusely reflective characteristics may be manifested to an observer as differences in iridescence, brightness, and/or diffusivity or haze between the treated and untreated zones in reflected and/or transmitted light, and these differences may also depend on the polarization state of the light, e.g., the s-polarized component versus the p polarized component of obliquely incident light. The differences between these properties may also change or shift with angle of incidence and/or angle of observation, and with the polarization state of the incident light and/or the observed light. The film 410 may have substantially the same film thickness in the zones 420, 422, 424, or the film thickness may vary somewhat between these zones, but any difference in film thickness between the zones is not primarily responsible for the differences between the first and second diffusely reflective characteristics. The zones 420, 422, 424 form a pattern that is internal or interior to the film, as indicated by the crosshatching in the stratum or layer 416. The crosshatching indicates that at least one of the materials or phases in those regions of the blended layer 411 has a reduced birefringence (including zero birefringence) compared to its or their birefringence in the zone 422 or in other untreated zones.

We now turn our attention to the idealized graphs of FIGS. 5A-J. These graphs help to explain the process of patterning the diffusely reflective optical films. They also help explain some of the different possible combinations of first and second diffusely reflective characteristics in the untreated and treated zones, respectively, and how they are achieved. For descriptive purposes, the diffusely reflective characteristics of both the untreated and treated zones of an optical film may be categorized into one of following three types: mirror-like diffusely reflective characteristics, window-like diffusely reflective characteristics, and polarizer-like diffusely reflective characteristics. A mirror-like diffusely reflective characteristic exhibits high diffuse reflectivity (e.g., in some cases greater than 50%, 60%, 70%, 80%, 90%, 95%, or 99%) for all polarization states of normally incident light, a window-like diffusely reflective characteristic exhibits low reflectivity (e.g., in some cases less than 20%, 10%, 5%, 3%, or 1%) for all polarization states of normally incident light, and a polarizer-like diffusely reflective characteristic exhibits high diffuse reflectivity (e.g., in some cases greater than 50%, 60%, 70%, 80%, 90%, 95%, or 99%) for normally incident light of one polarization state and low diffuse reflectivity (e.g., in some cases less than 30%, 20%, 10%, 5%, 3%, or 1%) for normally incident light of a different polarization state. (The diffusely reflective polarizer-like characteristic may alternatively be expressed in terms of the difference in reflectivity of one polarization state relative to the other polarization state.) The reader will keep in mind that reflectivity values discussed herein that are associated with diffusely reflective optical films or blended layers may or may not include the Fresnel reflections at the outer air/polymer interfaces. For example, in some cases of high reflectivity these values may include the surface contributions, but in some cases of low reflectivity, these may exclude the surface reflections. Reflectivity that includes the outer air/polymer surface contributions can be measured in a conventional manner using the bare film immersed in air, while reflectivity that does not include the air/polymer surface contributions can be measured by use of an index matching fluid with cover layers of known reflectivity, and subtracting the known reflectivity from the measurement.

The boundaries or limits of these different characteristics—e.g., what is considered to be "high" diffuse reflectivity and what is considered to be "low" diffuse reflectivity—and the distinctions therebetween may depend on the end-use application and/or on system requirements. For example, a diffusely reflective optical film, or a blended layer thereof, that exhibits moderate levels of diffuse reflectivity for all polarization states may be considered to be a diffuse mirror for purposes of some applications and a window for purposes of other applications. Similarly, a diffusely reflective optical film, or a blended layer thereof, that provides moderately different levels of diffuse reflectivity for different polarization states of normally incident light may be considered to be a diffuse polarizer for some applications, a diffuse mirror for other applications, and a window for still other applications, depending on the exact reflectivity values and on the sensitivity of a given end-use application to differences in reflectivity for different polarization states. Unless otherwise indicated, the mirror, window, and polarizer categories are specified for normally incident light. The reader will understand that oblique-angle characteristics may in some cases be the same as or similar to, and in other cases may be drastically different from, the characteristics of an optical film at normal incidence.

In each of the graphs of FIGS. 5A-J, relative refractive index "n" is plotted on the vertical axis. On the horizontal axis, a position or mark is provided for each of the six refractive indices that characterize a two-phase blended layer: "$1x$", "$1y$", and "$1z$" represent the refractive indices of a first material or phase along the x-, y-, and z-axes, which were referred to above as $n1x$, $n1y$, and $n1z$. Likewise, "$2x$", "$2y$", and "$2z$" represent the refractive indices of a second material or phase along the x-, y-, and z-axes, which were referred to above as $n2x$, $n2y$, and $n2z$. Recall that the terms "first" and "second" at least with regard to materials or phases of the blended layer may, in general, be assigned arbitrarily to any given material or phase as desired. Thus, each of FIGS. 5A-J may be interpreted in at least two different ways, e.g.: the first material and first phase associated with refractive indices $n1x$, $n1y$ and $n1z$ may be a continuous phase, and the second material and second phase associated with refractive indices $n2x$, $n2y$ and $n2z$ may be a disperse phase or co-continuous phase; or the first material and first phase associated with refractive indices $n1x$, $n1y$ and $n1z$ may be a disperse phase or co-continuous phase, and the second material and second phase associated with refractive indices $n2x$, $n2y$ and $n2z$ may be a continuous phase. Thus in the following discussions of FIGS. 5A-J, the descriptions using the first and second materials are merely for purposes of illustration and the reverse situation is implicit to the discussion.

Diamond-shaped symbols (◇) in the figures represent refractive indices of the materials in a first processing stage. This first stage may correspond to polymer layers that have been extruded and quenched or cast onto a casting wheel, for example, but that have not yet been stretched or otherwise oriented. Open (unfilled) circle-shaped symbols (○) in the figures represent refractive indices of materials in a second stage of processing, later than the first stage. The second stage may correspond to a blended layer that has been stretched or otherwise oriented into an optical film that diffusely reflects light by the scattering of light from interfaces between the first and second phases in the blended layer. Small filled circle-shaped symbols or dots (●) in the figures represent refractive indices of the materials in a third stage of processing, later than the first and second stages. The third stage may correspond to an optical film that, after being extruded and oriented, has been selectively heat treated, as discussed further below. Such heat treatment is typically limited to one or more particular portions or zones of a film, referred to as treated zones.

By comparing the vertical coordinates of the various symbols in a given figure, the reader can readily ascertain a great deal of information about the optical film, its method of manufacture, and the optical properties of its treated and untreated portions. For example, the reader can ascertain: if one or both materials or phases are or were birefringent before or after the selective heat treatment, and whether the birefringence is uniaxial or biaxial, and whether the birefringence is large or small. The reader can also ascertain from FIGS. 5A-J relative magnitudes of each of the refractive index differences $\Delta nx$, $\Delta ny$, $\Delta nz$ between the two layers, for each of the three processing stages (cast state, stretched state, and treated state).

As discussed above, a precursor article to the finished, internally patterned diffusely reflective optical film can be a cast web of polymer material. The cast web may have the same number of layers as the finished film, including at least one thick blended layer, and the layers may be composed of the same polymer materials as those used in the finished film, but the cast web is thicker and its layers, including the different phases of the thick blended layer, are usually all isotropic. In some cases, however, not depicted in the figures, the casting process may itself impart a level of orientation and birefringence in one or more of the materials. The diamond-shaped symbols in FIGS. 5A-J represent the refractive indices of the two polymer materials in the cast web that, after a subsequent stretching procedure, become the first and second phases in the blended layer of the diffusely reflective optical film. After stretching, at least one of the materials becomes oriented and birefringent, and an oriented (but still unpatterned) diffusely reflective optical film is formed. This is exemplified in FIGS. 5A-J by open circles that may be vertically displaced from their respective original values represented by the diamond-shaped symbols. For example, in FIG. 5A, the stretching procedure raises the refractive index of the second material or phase along the x-axis, but lowers its refractive index along the y- and z-axis. Such a refractive index shift may be obtained by suitably uniaxially stretching a positively birefringent polymer material along the x-axis while allowing the film to dimensionally relax along the y- and z-axes. In FIGS. 5B-D, the stretching procedure raises the refractive index of the first material or phase along the x- and y-axes, but lowers its refractive index along the z-axis. Such a refractive index shift may be obtained by suitably biaxially stretching a positively birefringent polymer material along the x- and y-axes. In FIG. 5E, the stretching procedure raises the refractive index of the first polymer material or phase along the x-axis, lowers its refractive index along the z-axis, and maintains about the same refractive index along the y-axis. In some cases, this refractive index shift may be obtained by biaxially stretching a positively birefringent polymer material asymmetrically along the x- and y-axes, using a higher degree of stretch along the x-axis compared to the y-axis. In other cases, this may be approximately obtained by uniaxially stretching along an x-axis while constraining the film in the y-axis (constrained uniaxial stretching). Note that in each of FIGS. 5B-E, the first material in the oriented but untreated state (open circles) is birefringent, because at least two of the open circles for $n1x$, $n1y$, and $n1z$ have different values of refractive index n. In these depicted embodiments, the second polymer material remains isotropic after stretching as indicated by the same refractive index values ($n2x=n2y=n2z$) for the cast state and for the oriented but untreated state.

After formation of the at least partially birefringent diffusely reflective optical film having the first and second materials arranged into first and second phases of the blended layer to provide the first diffusely reflective characteristic, the film is ready for the selective heating discussed above. The heating is carried out selectively in a second zone which neighbors a first zone of the optical film, and is tailored to selectively melt and disorient in part or in whole at least one birefringent material in the blended layer in order to reduce or eliminate the birefringence in at least one of the first and second phases while leaving their birefringence unchanged in the first (untreated) zone. In some cases, the selective heating may also be carried out to maintain the structural integrity or blend morphology of the first and second phases in the second zone. If the birefringent phase in the treated second zone is disoriented in whole, i.e., completely, then the birefringent phase returns to the isotropic state (e.g. of the cast web). This can be seen in FIGS. 5B-D, where heat treatment causes the refractive indices of the first material or phase (see the small dark dots associated with $n1x$, $n1y$, and $n1z$) to revert to their values in the cast web state (see the diamond-shaped symbols for the same refractive indices $n1x$, $n1y$, $n1z$). Recall that the diamond-shaped symbols represent the refractive indices of materials or phases in the isotropic state (e.g., the cast web), the small dark dots represent the refractive indices of materials or phases in the treated or selectively heated zones in the finished, internally patterned film, and the open circles represent the refractive indices of materials or phases in untreated zones of the finished, internally patterned film.

If the birefringent material in the treated second zone is disoriented only in part, i.e., incompletely, then the birefringent phase relaxes to a state of birefringence that is less than the birefringent state before heating but is not isotropic. In this case, the refractive indices of the birefringent phase in the treated second zone acquire values somewhere between the diamond-shaped symbols and the open circles shown in FIGS. 5A-J. Some examples of such incomplete birefringent relaxation are explained in more detail in commonly assigned PCT Publication WO 2010/075363 (Merrill et al.), "Internally Patterned Multilayer Optical Films With Multiple Birefringent Layers", incorporated herein by reference.

Figure 5A:
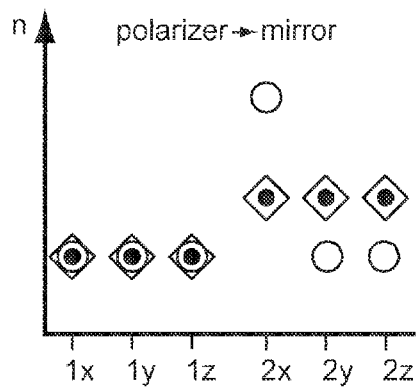
FIGS. 5A-J are idealized plots showing each refractive index (nx, ny, nz) of each of two distinct polymer materials that make up a blended layer, for different stages of manufacture of various internally patterned diffusely reflective optical films.
Figure 5B:
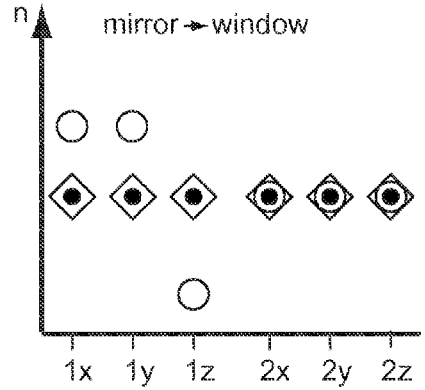
Figure 5C:
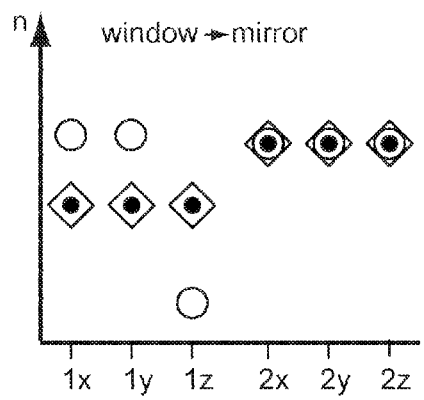
Figure 5D:
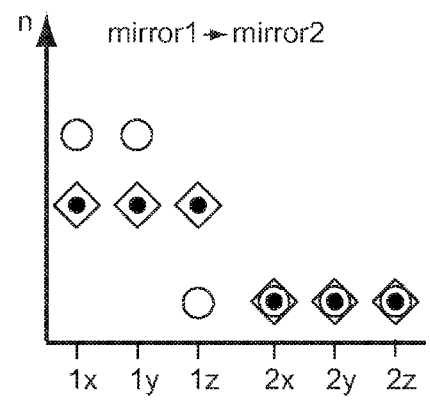
Figure 5E:
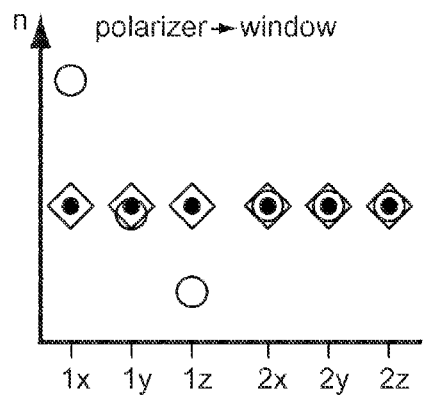

In FIG. 5A, a first polymer material is selected that has a relatively low refractive index, and a second polymer material is selected that has a higher refractive index and that has a positive stress-optic coefficient. The materials are immiscibly combined as first and second phases of a blended layer to form a cast web, having indices shown by the diamond-shaped symbols. The cast web is then uniaxially stretched along the x-axis under suitable conditions to induce birefringence in the second material or phase while the first material or phase remains isotropic. The refractive index value $n2x$ increases further to form a large index difference $\Delta nx$ with $n1x$. The refractive index values $n2y$ and $n2z$ decrease to form small index differences $\Delta ny$ and $\Delta nz$ with $n1y$ and $n1z$ respectively. The values $\Delta ny$ and $\Delta nz$ may be zero, for example. This set of refractive indices, when implemented in a blended layer with an adequate thickness, composition, and blend morphology, can provide a diffusely reflective polarizer with the x-axis being a block axis and the y-axis being a pass axis. The reflective polarizer may be broad band and reflect substantially white light, or in the case of lamellar blend morphologies, may have bands of iridescent color.

This diffusely reflective polarizing film can then be internally patterned in a second zone as described above, while leaving the polarizing film intact in a first zone. Selective heating by selective delivery of radiant energy to the second zone causes the birefringent second phase to relax to its original isotropic state, or to an intermediate birefringent state if the disorientation is incomplete. If relaxation is complete, the second zone can become a diffuse mirror-like film (if the blended layer has an adequate thickness, composition, and blend morphology) with $\Delta nx \approx \Delta ny \approx \Delta nz$. The finished film thus combines in a unitary film a diffusely reflective polarizer in one zone and a diffuse mirror-like film in a neighboring zone, with a blended layer that extends continuously from one zone to the next. For this FIG. 5A, the selective heat treatment process is able to change a diffusely reflective polarizer film to a diffuse reflective mirror film, i.e.: polarizer→mirror.

In FIG. 5B, first and second polymer materials are selected that have substantially the same refractive index, but where the first polymer material has a positive stress-optic coefficient. The materials are immiscibly combined as first and second phases of a blended layer to form a cast web, having indices shown by the diamond-shaped symbols. The cast web is then biaxially stretched along the x- and y-axes under suitable conditions to induce birefringence in the first material or phase while the second material or phase remains isotropic. The refractive index values $n1x$, $n1y$ increase to form substantial refractive index differences $\Delta nx$, $\Delta ny$ with $n2x$, $n2y$ respectively. The refractive index value $n1z$ decreases to form a substantial refractive index difference $\Delta nz$ with $n2z$ that is opposite in polarity or sign to $\Delta nx$ and $\Delta ny$. This set of refractive indices, when implemented in a blended layer with an adequate thickness, composition, and blend morphology, can provide a diffuse mirror-like film. The reflection provided by the film may be broad band and reflect substantially white light, or in the case of lamellar blend morphologies, may have bands of iridescent color.

This diffuse mirror-like film can then be internally patterned in a second zone as described above, while leaving the diffuse mirror-like film intact in a first zone. Selective heating by selective delivery of radiant energy to the second zone causes the birefringent first phase to relax to its original isotropic state, or to an intermediate birefringent state if the disorientation is incomplete. If relaxation is complete, the second zone becomes a window-like film with $\Delta nx \approx \Delta ny \approx \Delta nz \approx 0$. The diffuse reflective characteristic for this portion of the film is virtually no reflection and no scattering or haze, and virtually complete transmission (excluding Fresnel reflections at the two outer surfaces), even though the structure or blend morphology of the blended layer may be preserved. (In some practical embodiments, refractive index matching may not be perfect, and a small diffuse reflectivity may be advantageously detected, e.g. with a spectrophotometer, in at least one polarization state, confirming and revealing details of the preserved blended layer morphology.) The finished film thus combines in a unitary film a diffuse mirror-like reflector in one zone and a substantial window in a neighboring zone, with a blended layer that extends continuously from one zone to the next. For this FIG. 5B, the selective heat treatment process is able to change a diffuse reflective mirror film to a window film (mirror→window).

A straightforward alternative to the embodiment of FIG. 5B is shown in FIG. 5C, where the second (isotropic) material is replaced with a different isotropic material, whose refractive index substantially matches $n1x$ and $n1y$ in the oriented condition (open circles), while leaving the first (birefringent) material unchanged and using the same stretch conditions. In this case, the stretched film, before internal patterning, may have a very low diffuse reflectivity and high transmission—for a window-like appearance—at normal incidence. When this film is internally pattern by the delivery of radiant energy selectively to a second zone, while leaving the window-like film intact in a first zone, the selective heating causes the birefringent first material or phase to relax to its original isotropic state, or to an intermediate birefringent state if the disorientation is incomplete. If relaxation is complete, the second zone becomes a diffuse mirror-like film with large values for $\Delta nx \approx \Delta ny \approx \Delta nz$. The finished film thus combines in a unitary film a substantial window-like film in one zone and a substantial diffuse mirror-like film in a neighboring zone, with a blended layer that extends continuously from one zone to the next. For this FIG. 5C, the selective heat treatment process is able to change a window film to a diffuse reflective mirror film (window→mirror).

In FIG. 5D, a second material or phase is selected that has a relatively low refractive index, and a first material or phase is selected that has a higher refractive index and that has a positive stress-optic coefficient. The materials are immiscibly combined as second and first phases of a blended layer to form a cast web, having indices shown by the diamond-shaped symbols. The cast web is then biaxially stretched along the x- and y-axes under suitable conditions to induce birefringence in the first material or phase while the second material or phase remains isotropic. The refractive index values $n1x$, $n1y$ increase further to form substantial refractive index differences $\Delta nx$, $\Delta ny$ with $n2x$, $n2y$ respectively. The refractive index value $n1z$ decreases to form a substantial refractive index match ($\Delta nz \approx 0$) with $n2z$. This set of refractive indices, when implemented in a blended layer with an adequate thickness, composition, and blend morphology, can provide a first diffuse mirror-like film. This first diffuse mirror-like film exhibits a first angular dependence of s- and p-pol reflectivity with increasing incidence angle due to the substantial z-index match $\Delta nz \approx 0$.

This first diffuse mirror-like film can then be internally patterned in a second zone as described above, while leaving the first diffuse mirror-like film intact in a first zone. Selective heating by selective delivery of radiant energy to the second zone causes the birefringent first phase to relax to its original isotropic state, or to an intermediate birefringent state if the disorientation is incomplete. If relaxation is complete, the second zone becomes a second diffuse mirror-like film with a somewhat reduced reflectivity due to the smaller values of $\Delta nx$, $\Delta ny$, $\Delta nz$ in the second zone relative to the first zone. The second diffuse mirror-like film also exhibits different angle-dependent properties compared to the first zone. That is, the second diffuse mirror-like film exhibits a second angular dependence of s- and p-pol reflectivity with increasing incidence angle that is substantially different from the first angular dependence, due to the relatively large $\Delta nz$ and the Brewster effect in the second zone. The finished film thus combines in a unitary film a first diffuse mirror-like reflector in one zone and a second diffuse mirror-like reflector in a neighboring zone, with a blended layer that extends continuously from one zone to the next. For this FIG. 5D, the selective heat treatment process is able to change a diffuse reflective mirror film to a different diffuse reflective mirror film (mirror1→mirror2).

FIG. 5E depicts an alternative embodiment to that of FIG. 5B, where the same first and second polymer materials as those of FIG. 5B may be used, and the same or a similar cast web is produced, but wherein the cast web is processed under different orientation conditions so as to produce a diffuse polarizing film instead of a diffuse mirror film. The same polymer materials as those of FIG. 5B are extruded and cast onto a casting wheel to produce the cast web. One difference relative to the procedure of FIG. 5B may be to adjust the overall thickness of the cast web so that the finished stretched film is the same nominal thickness as that of FIG. 5B despite the differences in stretch conditions between the two embodiments. In the embodiment of this FIG. 5E, the cast web is oriented with a constrained uniaxial stretch—stretched along the x-axis, constrained along the y-axis—under suitable conditions to induce birefringence in the first material or phase while the second material or phase remains isotropic. The resulting diffuse polarizing film can then be internally patterned in a second zone as described above, while leaving the diffuse polarizing film intact in a first zone. Selective heating by delivery of radiant energy to the second zone causes the birefringent material or phase to relax to its original isotropic state, or to an intermediate birefringent state if the disorientation is incomplete. If relaxation is complete, the second zone becomes a window-like film with $\Delta nx \approx \Delta ny \approx \Delta nz \approx 0$. The finished film thus combines in a unitary film a diffuse reflective polarizer in one zone and a substantial window in a neighboring zone, with a blended layer that extends continuously from one zone to the next. For this FIG. 5E, the selective heat treatment process is able to change a diffuse reflective polarizer film to a window film (polarizer→window).

Figure 5F:
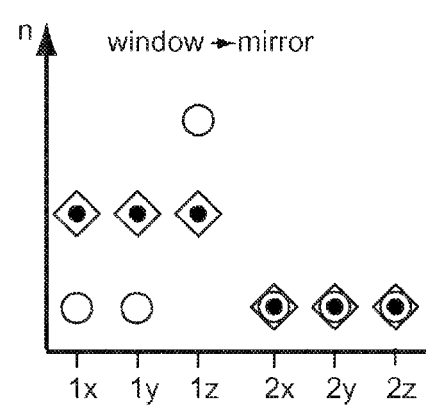

FIG. 5F, which depicts an alternative embodiment to that of FIG. 5C, provides a window-to-mirror film by using a negatively birefringent material rather than a positively birefringent material for the first material or phase. Just as in FIG. 5C, a second material or phase is chosen for the embodiment of FIG. 5F that has an isotropic refractive index that substantially matches the in-plane refractive indices of the first material ($n1x$ and $n1y$) in the oriented condition (open circles). And just as in FIG. 5C, the first and second materials are extruded in a blended layer and cast onto a casting wheel to produce a cast web. The cast web is then biaxially stretched along the x- and y-axes under suitable conditions to induce birefringence in the first material or phase while the second material or phase remains isotropic. The refractive index values $n1x$, $n1y$ decrease to substantially match the isotropic refractive index of the second material, such that $\Delta nx \approx \Delta ny \approx 0$. The refractive index value n1z increases to form a substantial refractive index difference Δnz with n2z. This set of refractive indices, when implemented in a blended layer with an adequate thickness, composition, and blend morphology, can provide a window film whose diffuse reflectivity for p-polarized obliquely incident light increases with increasing angle of incidence.

This window film can then be internally patterned in a second zone as described above, while leaving the window film intact in a first zone. Selective heating by delivery of radiant energy to the second zone causes the birefringent material or phase to relax to its original isotropic state, or to an intermediate birefringent state if the disorientation is incomplete. If relaxation is complete, the second zone becomes a diffuse mirror-like film with $\Delta nx \approx \Delta ny \approx \Delta nz \neq 0$. The finished film thus combines in a unitary film a window film in one zone and a diffuse mirror film in a neighboring zone, with a blended layer that extends continuously from one zone to the next. For this FIG. 5F, the selective heat treatment process is able to change a window film to a diffuse mirror film (window→mirror).

In each of FIGS. 5A-F, one of the optical materials or phases of the blended layer remains isotropic after stretching (and after the selective heat treatment). This, however, need not be the case in general, and many interesting and useful diffuse reflective optical film designs that can be converted into internally patterned optical films using the selective heat treatment techniques disclosed herein comprise two different optical materials or phases for the blended layer, and both (rather than only one) of these constituent materials or phases become birefringent when the cast web is stretched or otherwise oriented. Such optical films are referred to herein as "doubly birefringent" optical films, since the blended layer(s) in such a film each includes at least two distinct materials or phases that are birefringent after stretching. When such a doubly birefringent optical film is exposed to the selective heat treatment, a number of different responses are possible in the treated zone depending on the material properties and the heating conditions: both materials or phases may completely relax to become isotropic, or one material may relax completely or partially while the other material maintains its birefringence, or both materials may relax by different amounts (e.g., one material or phase may relax completely to become isotropic, while the other material or phase relaxes partially so as to maintain only a portion of its birefringence), for example. In any case, the change in birefringence of one or both distinct materials in the blended layer results in a diffusely reflective characteristic in the second (treated) zone of the optical film that differs substantially from a diffusely reflective characteristic in the first (untreated) zone of the film. Further details of doubly birefringent optical films, and selective heating techniques used to internally pattern them, are provided in the following commonly assigned PCT publications, which are incorporated herein by reference: WO 2010/075363 (Merrill et al.), "Internally Patterned Multilayer Optical Films With Multiple Birefringent Layers"; and WO 2010/075383 (Merrill et al.), "Multilayer Optical Films Having Side-by-Side Polarizer/Polarizer Zones". Some examples of doubly birefringent optical films suitable for internal patterning by selective heat treatment are shown in the present application in FIGS. 5G-J.

Figure 5G:
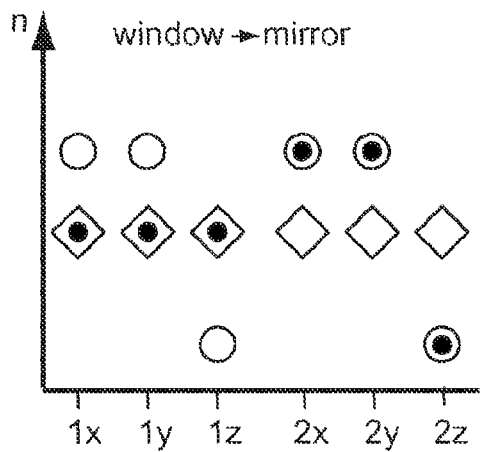

In FIG. 5G, first and second materials or phases are selected that have the same or similar isotropic refractive indices, and that have the same or similar stress-optic coefficients (shown as positive in FIG. 5G although negative coefficients may also be used), but that have different melting or softening temperatures. The materials are immiscibly mixed and extruded as first and second phases of a blended layer having a suitable thickness, composition, and blend morphology to form a cast web, having refractive indices shown by the diamond-shaped symbols. The cast web is then biaxially stretched along the x- and y-axes under suitable conditions to induce birefringence in both the first and second materials. The stretching causes the refractive index values n1x, n1y of the first material or phase to increase, and also causes the values n2x, n2y of the second material or phase to increase similarly, while also causing n1z and n2z to decrease by amounts that are similar to each other as shown, such that the refractive indices of the two materials or phases are substantially matched along all three principal directions ($\Delta nx \approx 0$, $\Delta ny \approx 0$, and $\Delta nz \approx 0$) even though each material or phase is strongly uniaxially birefringent. This set of refractive indices, when implemented in a blended layer with an adequate thickness, composition, and blend morphology, can provide a window-like film that has little or no reflectivity for normally incident and obliquely incident light.

This window film can then be internally patterned in a second zone as described above, while leaving the window film intact in a first zone. Selective heating by selective delivery of radiant energy to the second zone causes at least one of the birefringent materials or phases to relax, becoming less birefringent (which includes becoming isotropic). In the case of FIG. 5G, the heating is carefully controlled to a temperature that is above the melting or softening point of the first material, but below the melting or softening point of the second material. In this way, the selective heating causes the first material or phase in the second zone to relax to its original isotropic state, or to an intermediate birefringent state if the disorientation is incomplete, while causing the second birefringent material or phase in the second zone to substantially maintain its birefringence. If relaxation of the first material is complete, the second zone is characterized by relatively large in-plane refractive index differences (Δnx and Δny) and a relatively large out-of-plane refractive index difference Δnz of opposite polarity or sign compared to Δnx and Δny. These refractive index relationships, when implemented in a blended layer with an adequate thickness, composition, and blend morphology, can provide a diffuse mirror-like film in the second zone. The diffuse reflectivity of this mirror film increases with increasing incidence angle due to the opposite polarity of Δnz. The finished film thus combines in a unitary film a window film in one zone and a diffuse mirror-like reflector in a neighboring zone, with a blended layer that extends continuously from one zone to the next. For this FIG. 5G, the selective heat treatment process is able to change a window film to a diffuse reflective mirror film (window→mirror).

Figure 5H:
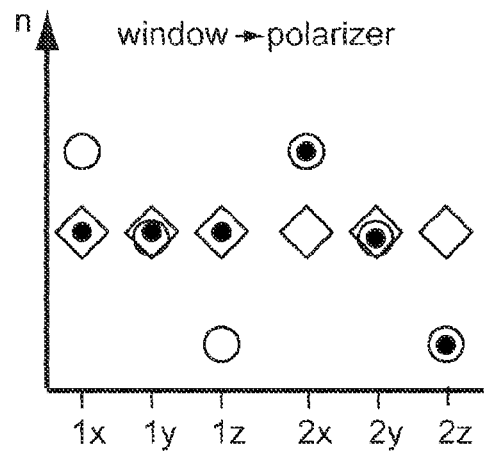

FIG. 5H depicts an embodiment that is similar to that of FIG. 5G. Again, first and second materials are selected that have the same or similar isotropic refractive indices, and that have the same or similar stress-optic coefficients (shown as positive in FIG. 5H although negative coefficients may also be used), and that have different melting or softening temperatures. The materials are immiscibly mixed and extruded as first and second phases of a blended layer having a suitable thickness, composition, and blend morphology to form a cast web, having refractive indices shown by the diamond-shaped symbols. Rather than being biaxially drawn, the cast web of FIG. 5H is then uniaxially stretched along the x-axis (while constraining the film along the y-axis) under suitable conditions to induce birefringence in both the first and second materials or phases. The stretching causes the refractive index values n1x and n2x to increase by similar amounts, while causing n1z and n2z to decrease by similar amounts, and while causing n1y and n2y to remain relatively constant. This results in refractive indices of the two materials or phases that are substantially matched along all three principal directions (Δnx≈0, Δny≈0, and Δnz≈0), even though each material or phase is strongly biaxially birefringent. This set of refractive indices, when implemented in a blended layer with an adequate thickness, composition, and blend morphology, can provide a window-like film that has little or no reflectivity for normally incident and obliquely incident light.

This window film can then be internally patterned in a second zone as described above, while leaving the window film intact in a first zone. Selective heating by selective delivery of radiant energy to the second zone causes at least one of the birefringent materials or phases to relax, becoming less birefringent. In the case of FIG. 5H, the heating is again carefully controlled to a temperature that is above the melting or softening point of the first material, but below the melting or softening point of the second material. In this way, the selective heating causes the first material or phase in the second zone to relax to its original isotropic state, or to an intermediate birefringent state if the disorientation is incomplete, while causing the second material or phase in the second zone to substantially maintain its birefringence. If relaxation of the first material is complete, the second zone is characterized by a relatively large refractive index difference (Δnx) in one in-plane direction, a zero or near-zero refractive index difference (Δny) in the other in-plane direction, and a relatively large out-of-plane refractive index difference (Δnz) of opposite polarity or sign compared to Δnx. These refractive index relationships, when implemented in a blended layer with an adequate thickness, composition, and blend morphology, can provide a diffusely reflective polarizer film in the second zone. This polarizer film has a pass axis parallel to the y-direction and a block axis parallel to the x-direction. The diffuse reflectivity of the polarizer film for block-state polarized light (for both the s-polarized component and the p-polarized component) increases with increasing incidence angle due to the opposite polarity of Δnz. The finished film thus combines in a unitary film a window film in one zone and a diffusely reflective polarizer film in a neighboring zone, with a blended layer that extends continuously from one zone to the next. For this FIG. 5H, the selective heat treatment process is able to change a window film to a diffusely reflective polarizer film (window→polarizer).

Figure 5I:
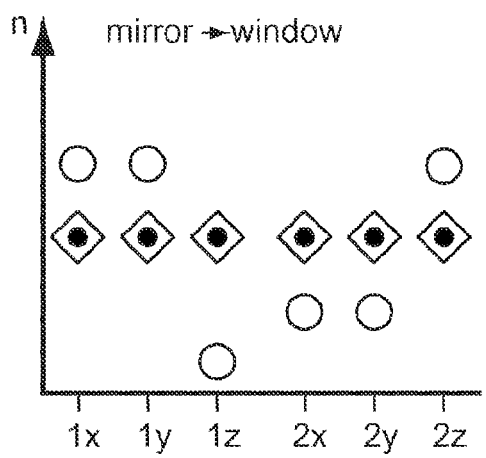

FIG. 5I depicts an embodiment that is also similar in some respects to that of FIG. 5G but different from FIG. 5H. Again, first and second materials are selected that have the same or similar isotropic refractive indices, and that both become birefringent after drawing. The first and second materials may have different melting or softening temperatures, or they may be substantially the same. Significantly, however, the materials of FIG. 5I are chosen to have stress-optic coefficients of different polarities or signs. In the depicted embodiment, the first material has a positive stress-optic coefficient and the second material has a negative stress-optic coefficient, although the opposite selection can also be made. The materials are immiscibly mixed and extruded as first and second phases of a blended layer having suitable thickness, composition, and blend morphology to form a cast web, having indices shown by the diamond-shaped symbols. Similar to FIG. 5G, the cast web of FIG. 5I is then biaxially stretched along the x- and y-axes under suitable conditions to induce birefringence in both the first and second materials or phases. The stretching causes the refractive index values n1x and n1y to increase by similar amounts, while causing a larger decrease in n1z. The stretching also causes the refractive index values n2x and n2y to decrease by similar amounts, while causing a larger increase in n2z. This results in refractive indices of the two materials or phases that have substantially equal in-plane refractive index mismatches (Δnx≈Δny) and an even larger out-of-plane refractive index mismatch Δnz of opposite polarity or sign. This set of refractive indices, when implemented in a blended layer with an adequate thickness, composition, and blend morphology, can provide a diffuse mirror-like film. The diffuse reflectivity of this mirror film increases with increasing incidence angle due to the opposite polarity of Δnz.

This diffuse mirror film can then be internally patterned in a second zone as described above, while leaving the mirror film intact in a first zone. Selective heating by selective delivery of radiant energy to the second zone causes at least one of the birefringent materials or phases to relax, becoming less birefringent. In the case of FIG. 5I, the heating is controlled to a temperature that is above the melting or softening point of the both the first and second materials. Accordingly, this heating causes both the first and the second birefringent materials or phases in the second zone to relax to their original isotropic states, or to an intermediate birefringent state if the disorientation is incomplete. If relaxation of the materials is complete, the second zone is characterized by a substantial match of refractive indices along all three principal directions, i.e., Δnx≈Δny≈Δnz≈0. These refractive index relationships, when implemented in a blended layer with an adequate thickness, composition, and blend morphology, can provide a window film in the second zone. The finished film thus combines in a unitary film a diffuse mirror film in one zone and a window film in a neighboring zone, with a blended layer that extends continuously from one zone to the next. For this FIG. 5I, the selective heat treatment process is able to change a diffuse mirror film to a window film (mirror→window).

Figure 5J:
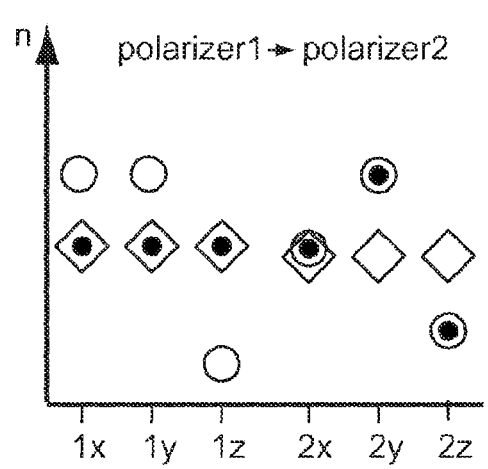

The embodiment of FIG. 5J makes use of a two-step drawing process that is described in U.S. Pat. No. 6,179,948 (Merrill et al.). In this process, the stretching or orientation of the cast film is carried out using a two-step drawing process that is carefully controlled so that one material or phase (e.g., the first material or phase of the blended layer) substantially orients during both drawing steps, while the other material or phase (e.g., the second material or phase of the blended layer) only substantially orients during one drawing step. The result is a diffusely reflective optical film having one material or phase that is substantially biaxially oriented after drawing, and having another material or phase that is substantially uniaxially oriented after drawing. The differentiation is accomplished by leveraging the different visco-elastic and crystallization characteristics of the two materials by using one or more suitably different process conditions such as temperature, strain rate, and strain extent for the two process drawing steps. Thus, for example, a first drawing step may substantially orient the first material along a first direction while at most only slightly orienting the second material along this direction. After the first drawing step, one or more process conditions are suitable changed such that in a second drawing step, both the first and the second materials are substantially oriented along a second direction. Through this method, the first material can assume an essentially biaxially-oriented character (for example, the refractive indices may satisfy the relationship n1x≈n1y≠n1z, sometimes referred to as a uniaxially birefringent material), while the second material in the very same blended layer can assume an essentially uniaxially-oriented character (for example, the refractive indices may satisfy the relationship n2x≠n2y≠n2z≠n2x, sometimes referred to as a biaxially birefringent material).

With this background, FIG. 5J depicts an embodiment in which the first and second materials are selected to have the same or similar isotropic refractive indices, and to both become birefringent after drawing, and to have the same polarity of stress-optic coefficient (in the drawing they are both depicted as positive, but they can instead both be negative). The first and second materials have different melting or softening temperatures, and have different viscoelastic and/or crystallization characteristics such that the two-step drawing process discussed above can be implemented. The materials are immiscibly mixed and extruded as first and second phases of a blended layer having suitable thickness, composition, and blend morphology to form a cast web, having indices shown by the diamond-shaped symbols. The cast web is then biaxially stretched along the x- and y-axes using the above-described two-step drawing process, such that the first material or phase is oriented comparably along both the x- and y-axes, whereas the second material or phase is oriented preferentially along the y-axis, with little or no orientation along the x-axis. The net result is an optical film whose first and second materials or phases are both birefringent, but the first material has a substantially biaxially-oriented character, whereas the second material has a substantially uniaxially-oriented character. As shown, the materials and process conditions are selected so that the stretching causes the refractive index values n1x and n1y to increase by similar amounts, while causing n1z to decrease by a larger amount. The stretching also causes the refractive index value n2y to increase to a value equal to or close to that of n1x and n1y, and causes the refractive index n2z to decrease, and causes the refractive index n2x to remain about the same (if the second material orients to a small degree during the x-axis orientation step, then n2x may increase slightly as shown in the figure). This results in refractive indices of the two materials or phases that have one large in-plane refractive index mismatch (Δnx), one significantly smaller in-plane refractive index mismatch (Δny≈0), and an intermediate out-of-plane refractive index mismatch (Δnz) of opposite polarity from Δnx. This set of refractive indices, when implemented in a blended layer with an adequate thickness, composition, and blend morphology, can provide a first diffusely reflective polarizing film with a block axis along the x-direction and a pass axis along the y-direction.

This first diffusely reflective polarizer film can then be internally patterned in a second zone as described above, while leaving the polarizer film intact in a first zone. Selective heating by selective delivery of radiant energy to the second zone causes at least one of the birefringent materials or phases to relax, becoming less birefringent. In the present case, the heating is carefully controlled to a temperature that is above the melting or softening point of the first material or phase, but below the melting or softening point of the second material or phase. In this way, the selective heating causes the first material or phase in the second zone to relax to its original isotropic state, or to an intermediate birefringent state if the disorientation is incomplete, while causing the second material or phase in the second zone to substantially maintain its birefringence. If relaxation of the first material is complete, the second zone is characterized by a relatively large refractive index difference (Δny) in one in-plane direction, a zero or near-zero refractive index difference (Δnx) in the other in-plane direction, and a relatively large out-of-plane refractive index difference (Δnz) of opposite polarity or sign compared to Δny. These refractive index relationships, when implemented in a blended layer with an adequate thickness, composition, and blend morphology, can provide a second diffusely reflective polarizer film in the second zone. Notably, this second diffuse polarizer has a pass axis parallel to the x-direction and a block axis parallel to the y-direction, i.e., it is perpendicularly oriented relative to the first diffusely reflective polarizer. The diffuse reflectivity of the second polarizer film for block-state polarized light (for both the s-polarized component and the p-polarized component) increases with increasing incidence angle due to the opposite polarity of Δnz in the second zone. The finished film thus combines in a unitary film a first diffusely reflective polarizer film in one zone and a second diffusely reflective polarizer film in a neighboring zone, the second polarizer film being oriented perpendicular to the first polarizer film, with a blended layer that extends continuously from one zone to the next. For this FIG. 5J, the selective heat treatment process is able to change a first diffusely reflective polarizer film to a second diffusely reflective polarizer film (polarizer1→polarizer2).

Of course, a multitude of possible combinations of diffuse reflector types for the first zone and diffuse reflector types for the second zone can be selected, and the embodiments described in connection with FIGS. 5A-J demonstrate only some such combinations and should not be considered to be limiting. Note that not just positively birefringent but also negatively birefringent materials, and combinations thereof, can be used. Note also that in cases where the combination of a birefringent and isotropic polymer is used, the birefringent polymer may have a pre-stretch isotropic refractive index that is less than, greater than, or equal to the refractive index of the isotropic polymer. In fact, the pre-stretch isotropic refractive indices of the materials, regardless of the type of materials used, may be matched or substantially matched, or may be substantially mismatched as needed to produce the desired reflective characteristics in the finished film.

Figure 6:
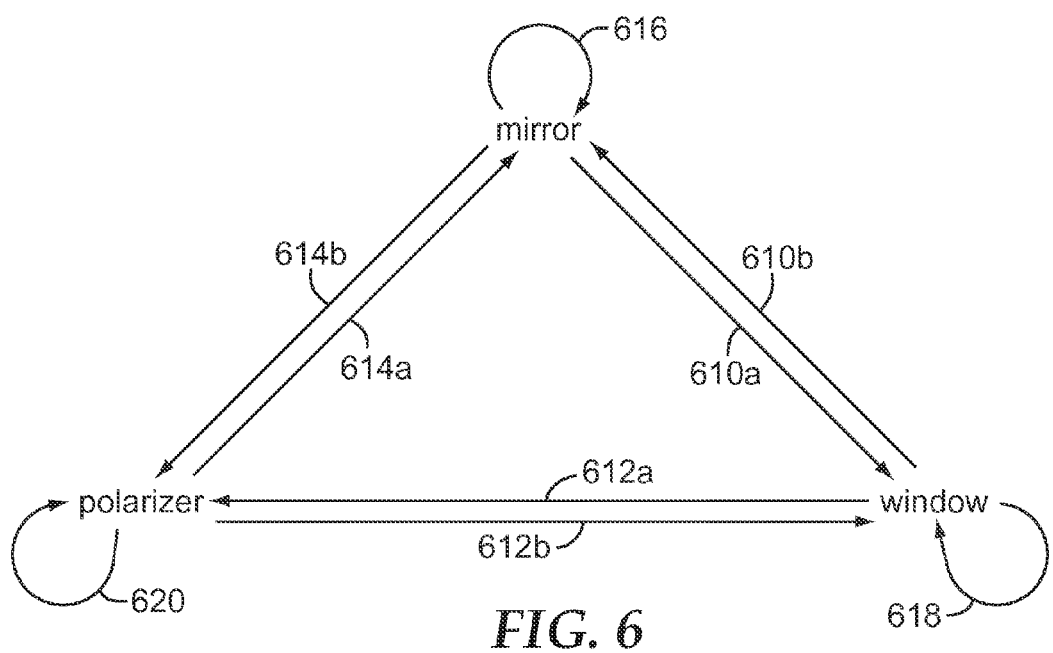
FIG. 6 is a schematic diagram that summarizes various transformations that can be achieved using the techniques discussed herein for diffusely reflective optical films.

FIG. 6 is a schematic diagram that summarizes various transformations that can be achieved using the birefringent-relaxation techniques discussed herein for diffusely reflective optical films. As such, the diagram also summarizes a variety of combinations of reflector types for the first (untreated) zone and the second (heat treated) zone of an internally patterned optical film whose diffuse reflectivity is the substantial result of at least one blended layer. The arrows in the figure represent transformations from a first diffusely reflective characteristic to a second diffusely reflective characteristic that differs substantially from the first diffusely reflective characteristic. Note again, for ease of discussion, that a "diffusely reflective characteristic" is intended to encompass a highly transparent, low haze (including no haze or scattering) characteristic associated with a window-like film, provided such film was transformed from, or can be transformed into, a film with substantial haze or light scattering properties for light of at least one incident direction and polarization state. Note also that the diagram of FIG. 6 is provided for illustrative purposes and should not be construed as limiting.

Arrow 610a represents a transformation from a diffuse mirror film to a window film, e.g., as described in connection with FIGS. 5B and 5I. Such a transformation can be used to provide an internally patterned optical film with one or more first (untreated) zones characterized by a diffuse mirror film and one or more second (treated) zones characterized by a window film. Arrow 610*b* represents an opposite transformation, from a window film to a diffuse mirror film, e.g., as described in connection with FIGS. 5C, 5F, and 5G. Such a transformation can be used to provide an internally patterned optical film with one or more first (untreated) zones characterized by a window film and one or more second (treated) zones characterized by a diffuse mirror film.

Arrow 612*a* represents a transformation from a window film to a diffuse polarizer film, e.g., as described in connection with FIG. 5H. Such a transformation can be used to provide an internally patterned optical film with one or more first (untreated) zones characterized by a window film and one or more second (treated) zones characterized by a diffuse polarizer film. Arrow 612*b* represents an opposite transformation, from a diffuse polarizer film to a window film, e.g., as described in connection with FIG. 5E. Such a transformation can be used to provide an internally patterned optical film with one or more first (untreated) zones characterized by a diffuse polarizer film and one or more second (treated) zones characterized by a window film.

Although many diffusely reflective polarizing films are designed to have little or no reflectivity for normally incident light polarized parallel to the pass axis, in some applications it is desirable for the a diffuse reflective polarizing film to exhibit a small or even a substantial reflectivity for such light. Such films may have first and second materials or phases in its blended layer that have substantial values for both of the in-plane refractive index differences $\Delta nx$ and $\Delta ny$ in the drawn (stretched) film, although one of these index differences is significantly larger than the other one so as to provide a block axis and a pass axis. If these refractive index relationships are implemented in a blended layer with an adequate thickness, composition, and blend morphology, the result may be an asymmetric diffuse reflecting film referred to herein as a partial diffuse polarizer. Such a film provides a high degree of diffuse reflectivity for normally incident light of one polarization, and a much smaller, yet substantial, degree of diffuse reflectivity for normally incident light of the opposite polarization. Such polarizing films can be particularly useful in certain high efficiency, low loss display applications, for example, and in light recycling and spatial homogenization systems, and in other applications. Reference is made to PCT Publication WO 2008/144656 (Weber et al.), "Backlight and Display System Using Same" for further disclosure of such films, which are referred to in that publication as Asymmetric Reflecting Films (ARF), and applications of such films.

Arrow 614*a* represents a transformation from a diffuse polarizer film to a diffuse mirror film, e.g., as described in connection with FIG. 5A. Such a transformation can be used to provide an internally patterned optical film with one or more first (untreated) zones characterized by a diffuse polarizer film and one or more second (treated) zones characterized by a diffuse mirror film. Arrow 614*b* represents an opposite transformation, from a diffuse mirror film to a diffuse polarizer film. Such a transformation can be used to provide an internally patterned optical film with one or more first (untreated) zones characterized by a diffuse mirror film and one or more second (treated) zones characterized by a diffuse polarizer film.

Arrows 616, 618, and 620 represent transformations from one type of diffuse mirror to another type of diffuse mirror (see e.g. FIG. 5D), from one type of window to another type of window, and from one type of diffuse polarizer to another type of diffuse polarizer (see e.g. FIG. 5J). Window-to-window type transformations (window1→window2) may be achieved using any of the refractive index transformations discussed above (including but not limited to those depicted in FIGS. 5A-J), but where the thickness, composition, and/or blend morphology of the blended layer is or are tailored such that, for any given phase-to-phase refractive index difference, the blended layer provides a low enough diffuse reflectivity to be considered a window-like reflective characteristic. Recall from the discussion above that very faint diffuse reflectivities can be detected with an instrument such as a spectrophotometer even in cases where the film appears to be substantially clear or transparent to the ordinary observer. The reader is again reminded that the diagram of FIG. 6 is provided for illustrative purposes and should not be construed in a limiting fashion.

At this point, after having reviewed FIGS. 5A-J and FIG. 6, the reader will appreciate that the selective heat treatment discussed herein to reduce the birefringence of at least one of the materials or phases in blended layer of an optical film can be used to "turn on" the optical film, i.e., change it from an initial diffuse reflectivity (for at least one polarization state), which may be relatively low, to a substantially higher diffuse reflectivity, or it can be used to "turn off" the optical film, i.e., change it from an initial diffuse reflectivity (for at least one polarization state), which may be relatively high, to a substantially lower diffuse reflectivity. Stated differently, the selective heat treatment can be used to increase the refractive index mismatch along one or more axes between the phases in a blended layer, or it can be used to decrease the refractive index mismatch.

The fact that the change in the reflective characteristic of the STOF film is associated primarily with heat-induced relaxation in birefringence of a material or layer of the STOF film means that the selective treatment process used to pattern the STOF film may be primarily one-way or irreversible. For example, a given area or zone of the STOF film that has been processed (selectively heat treated by absorption of radiant energy) so that its initial first reflection characteristic has been changed to a second reflection characteristic may thereafter not be able to be processed with another radiant beam to re-acquire its original first reflection characteristic. In fact, if the initial heat treatment substantially eliminated birefringence in the zone, then further radiant treatment with the same or similar radiant beam may have little or no additional effect on the reflective characteristic of the zone. This one-way or irreversible aspect of STOF film patterning may be particularly advantageous e.g. in security applications where, for example, tamper-resistance is important, or in display or opto-electronic applications where for example stability to optical or electronic fields, used to switch other component elements, is desired. In other applications, this one-way or irreversible aspect of STOF film patterning in a continuous phase may be combined with switchable elements in another phase, e.g. in opto-electronic devices where for example a stable, patterned continuous phase with birefringence in a first zone and little or no birefringence in a second zone is desired.

Figure 7:
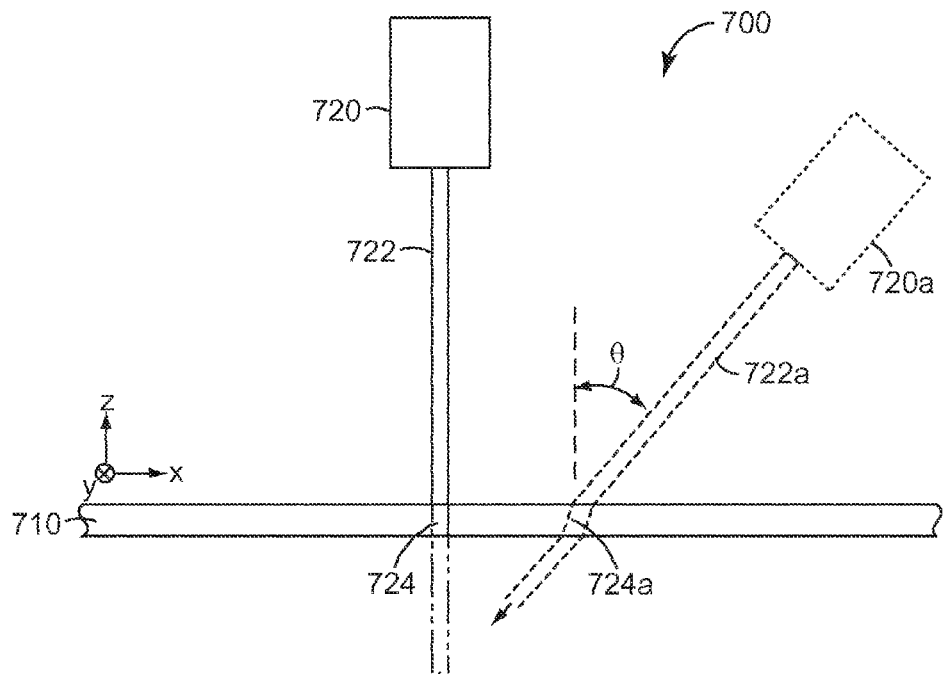
FIG. 7 is a schematic side view of an arrangement for selectively heating a diffusely reflective optical film to accomplish internal patterning.

In FIG. 7, we show one arrangement 700 that can be used to selectively heat the second zone of the diffusely reflective optical films to provide the disclosed internally patterned films. Briefly, an optical film 710 is provided that comprises at least one blended layer that extends throughout the film, or at least from a first to a second zone thereof. Distinct first and second phases of the blended layer are internal to the film and provide the film with a first diffuse reflective characteristic. A high radiance light source 720 provides a directed beam 722 of suitable wavelength, intensity, and beam size to selectively heat an illuminated portion 724 of the film by converting some of the incident light to heat by absorption. Preferably, the absorption of the film is great enough to provide sufficient heating with a reasonably-powered light source, but not so high that an excessive amount of light is absorbed at the initial surface of the film, which may cause surface damage. This is discussed further below. In some cases it may be desirable to orient the light source at an oblique polar angle θ, as shown by the obliquely positioned light source 720a, directed beam 722a, and illuminated portion 724a. Such oblique illumination may be desirable where the diffuse reflectivity of the optical film 710 changes with incidence angle and/or polarization state. For asymmetric diffuse reflectors, like reflective polarizers, it may also be desirable to orient the light source at a controlled azimuthal angle φ. At one incident direction (defined e.g. by a given (θ,φ) coordinate pair) and polarization state, for example, the film may scatter the directed beam 722/722a to a great extent in a way that prevents the desired amount of absorption and concomitant heating of the blended layer in the second zone. At a different incident direction (θ,φ) and/or polarization state, the scattering may be substantially reduced so as to allow the desired amount of absorption and concomitant heating of the blended layer in the second zone to produce the birefringence relaxation and reflectivity transformations discussed above. Thus, the incident direction (θ,φ) and the polarization state of the directed beam 722/722a can be selected to avoid excessive scattering through the blended layer, e.g., they can be selected to coincide with a minimum scattering of the blended layer or optical film, or stated differently to coincide with a maximum of specular transmission through the blended layer. If the diffusely reflective film is a reflective polarizer, the polarization state may desirably be a pass state of the polarizer.

Because the blend construction, unlike the analogous multilayer, tends to have at least a residual scattering at typical wavelengths used for treatment, the fidelity and precision of the second zone, e.g. the width of the transition between the zones and the minimum size of a second zone, may also be affected by the conditions of the first and second diffuse reflectivities for the angle and polarization chosen for the directed beam, as measured over the directed beam's wavelength band. Typically, minimizing the scattering during treatment by the directed beam will tend to improve fidelity and precision.

In one useful measurement method, the minimum scattering may be defined by the integrated transmission (e.g. via the measured, transmission BSDF) over a fixed solid angle about the axis of incidence/exitance (e.g. a cone of total angle of 15 degrees, i.e +/−7.5 degrees from the specular angle of exitance or about 0.82 steradians of solid angle), rather than the total transmission T from integration over the total 2π solid angle of the transmission hemisphere. This quantity may be taken as being representative of the specular transmission through the blended layer. This specular transmission may vary with the direction (θ,φ) and polarization state of the incident beam, in which case a maximum value or region of comparably similarly high values may be found. When the scattering shows appreciable changes with wavelength, it may be advantageous to measure the BSDFs for the first zone using the writing wavelength at an intensity low enough to prevent treatment during measurement. In the case of a diffuse reflective polarizer, it may be advantageous to radiantly treat the film with light polarized along the pass state at normal incidence. When the system demonstrates a Brewster's angle in at least the first or second zone, then it may be advantageous to use the p-polarization state for processing with the beam directed at an angle off-normal. In the case of a diffuse reflective polarizer with a Brewster's angle, it may be advantageous to treat the film with light polarized along this Brewster's (polar) angle in the azimuthal pass state plane.

When the system exhibits substantially different polar and azimuthal coordinates for maximum specular transmission between the first and second zones, intermediate coordinates may provide the optimum condition for treatment. For example, if the maximum specular transmission for the first zone is found at an incident direction $(\theta_1,\varphi_1)$, and the maximum specular transmission for the second zone is found at an incident direction $(\theta_2,\varphi_2)$, then an optimum may sometimes be found at an intermediate direction $(\theta_3,\varphi_3)$ such that intermediate polar angle $\theta_3$ is between $\theta_1$ and $\theta_2$, and the intermediate azimuthal angle $\varphi_3$ is between $\varphi_1$ and $\varphi_2$.

When the system exhibits increased scattering from the first to second zone for the conditions of the treatment or writing beam, the beam may become more diffuse over the course of treatment. It may be advantageous in these cases to place the beam focus point behind the film plane, e.g. to help convert the back portions of the blended layers earlier in the process. Even when the scattering decreases in the second zone, it may also be advantageous to place the beam focal point behind the film plane to balance the intensities from the front to the back of the film due to absorption of a portion of the beam energy by the film. In many cases, the beam focus should be slow, e.g. slowing changing in beam width, so that variations in the positioning of the film are less critical. The speed of the focus may also affect the width of the transition between the first and second zones.

In some cases, the directed beam 722 or 722a may be shaped in such a way that the illuminated portion 724 or 724a has the desired shape of the finished second zone. In other cases, the directed beam may have a shape that is smaller in size than the desired second zone. In the latter situation, beam steering equipment can be used to scan the directed beam over the surface of the optical film so as to trace out the desired shape of the zone to be treated. Spatial and temporal modulation of the directed beam can also be utilized with devices such as beam splitters, lens arrays, pockels cells, acousto-optic modulators, and other techniques and devices known to those of ordinary skill in the art.

Figure 8A:
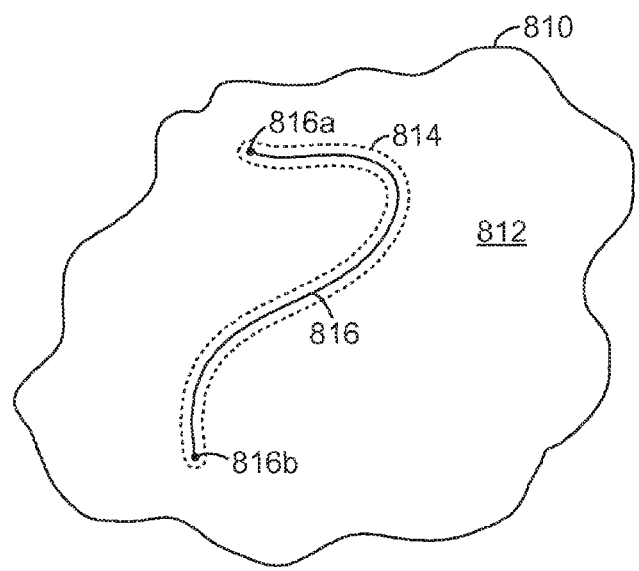
FIGS. 8A-C are schematic top views of different second zones of an internally patterned optical film, and superimposed thereon possible paths of a light beam relative to the film capable of forming the depicted zones.
Figure 8B:
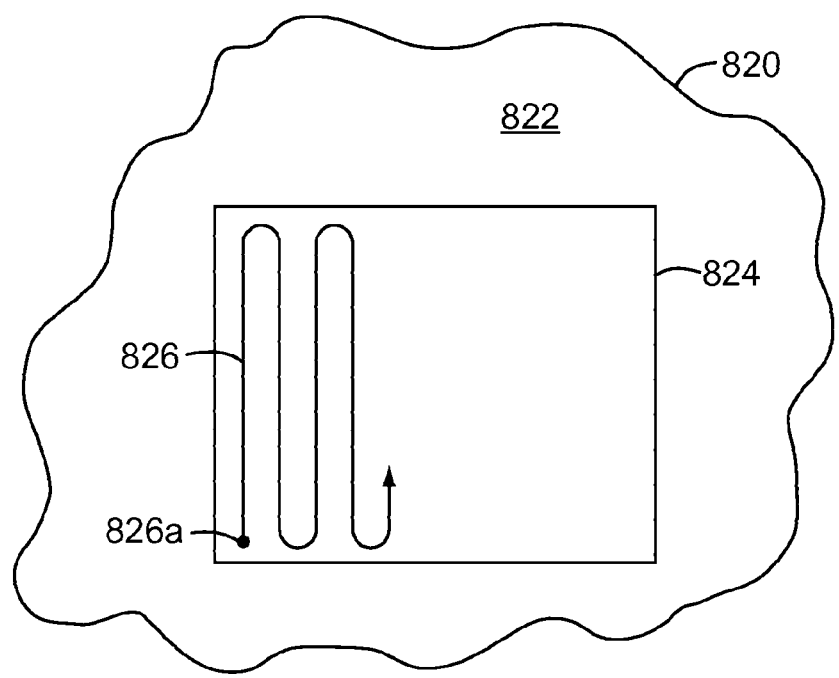
Figure 8C:
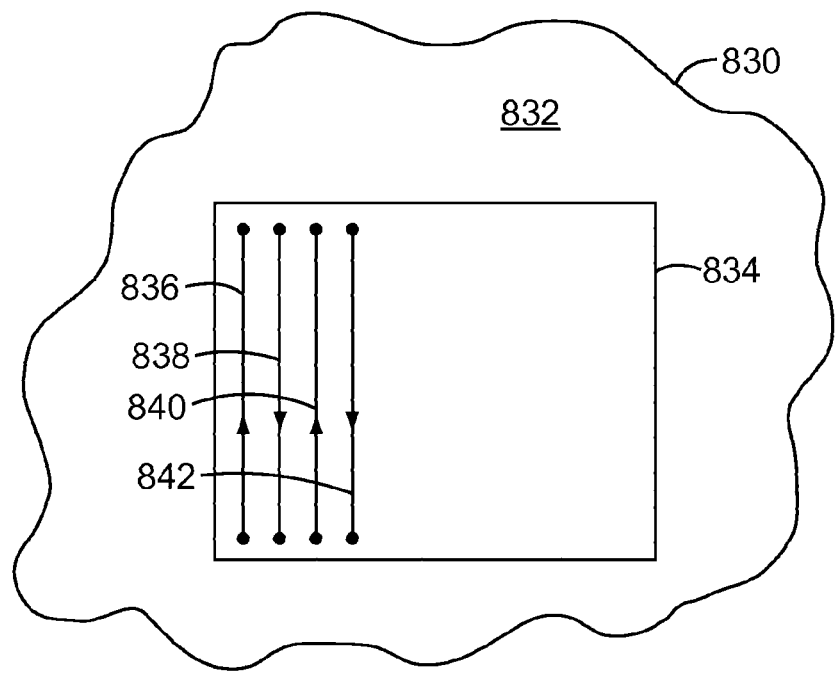

FIGS. 8A-C provide schematic top views of different second zones of a patterned diffuse reflective film, and superimposed thereon possible paths of a directed light beam relative to the film capable of forming the depicted zones. In FIG. 8A, a light beam is directed at an optical film 810 and scanned at a controlled speed from a starting point 816a to an ending point 816b along a path 816 to selectively heat the film in an arbitrarily-shaped zone 814 to distinguish it from a first zone 812. FIGS. 8B and 8C are similar. In FIG. 8B, a light beam is directed at an optical film 820 and scanned at a controlled speed from a starting point 826a along a path 826 to selectively heat the film in a rectangular-shaped zone 824 to distinguish it from a neighboring first zone 822. In FIG. 8C, a light beam is directed at an optical film 830 and scanned at controlled speeds along the discontinuous paths 836-842, and so on, to selectively heat the film in a rectangular-shaped zone 834 to distinguish it from a neighboring first zone 832. In each of FIGS. 8A-C, the heating is sufficient to reduce or eliminate birefringence of at least one interior material or phase of a blended layer in the second zone while maintaining the birefringence of that material or phase in the first zone. In some cases, the heating may also be accomplished while maintaining the structural integrity (blend morphology) of the distinct phases of the blended layer in the second zone and without any selective application of pressure to the second zone.

Figure 9A:
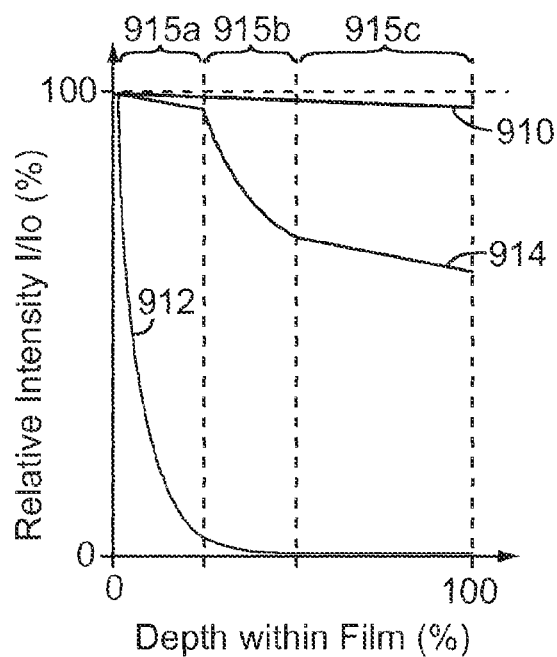
FIG. 9A is an idealized plot showing the relative intensity of a beam of light as a function of the depth as the light beam propagates into the film, with three curves provided for three different optical films.
Figure 9B:
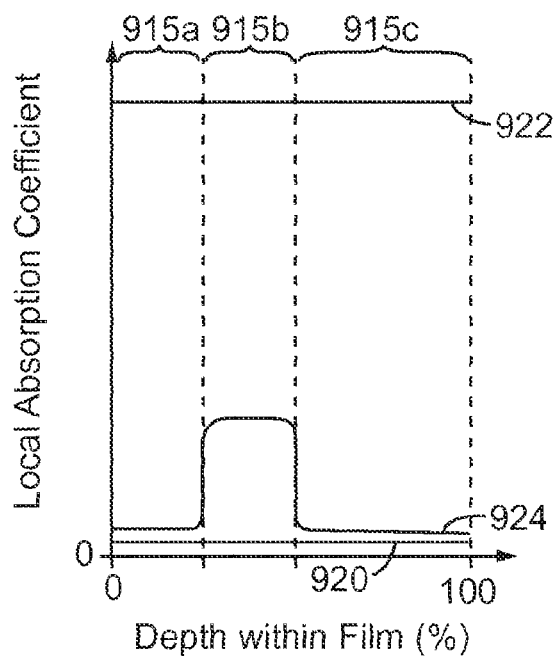
FIG. 9B is an idealized plot showing a local absorption coefficient as a function of the depth or axial position within the film, with three curves corresponding to the three curves of FIG. 9A.

FIGS. 9A and 9B address the topic of how the absorption of the optical film can or should be tailored to provide optimal localized heating. The graphs of FIGS. 9A and 9B are plotted on the same horizontal scale, which represents the depth or position of the radiant light beam as it propagates through the film. A depth of 0% corresponds to the front surface of the film, and a depth of 100% corresponds to the rear surface of the film. FIG. 9A plots along the vertical axis the relative intensity $I/I_0$ of the radiant beam. FIG. 9B plots the local absorption coefficient (at the selected wavelength or wavelength band of the radiant beam) at each depth within the film.

Three curves are plotted in each figure, for three different optical film embodiments. Each of the embodiments assumes a three-layer construction, with the middle layer (corresponding to region 915b) having a blended character with at least first and second distinct phases, and the outer layers (corresponding to regions 915a and 915c) being of uniform composition, e.g., composed of a low haze light transmissive polymer material. In a first embodiment, the film has a substantially uniform and low absorption throughout its thickness at the wavelength of the directed light beam. This embodiment is plotted as curve 910 in FIG. 9A and curve 920 in FIG. 9B. In a second embodiment, the film has a substantially uniform and high absorption throughout its thickness. This embodiment is plotted as curve 912 in FIG. 9A and curve 922 in FIG. 9B. In a third embodiment, the film has a relatively low absorption throughout regions 915a and 915c of its thickness, but has a higher, intermediate absorption in region 915b of its thickness.

The first embodiment has an absorption coefficient that is too low for many situations. Although the directed light beam is absorbed uniformly as a function of depth as indicated by the constant slope of the curve 910, which may be desirable in some cases, very little of the light is actually absorbed as shown by the high value of the curve 910 at a depth of 100%, meaning that a high percentage of the directed light beam is wasted. Nevertheless, in some cases this first embodiment may still be quite useful in the treatment of some films. The second embodiment has an absorption coefficient that is too high for many situations. Although substantially all of the directed light beam is absorbed, and none is wasted, the high absorption causes an excessive amount of light to be absorbed at the front surface of the film, which may cause surface damage to the film. If the absorption is too high, an adequate amount of heat cannot be delivered to interior portions of the blended layer without damaging portions of the blended layer at or near the front surface of the film. The third embodiment utilizes a non-uniform absorption profile that may be achieved, for example, by incorporating an absorbing agent selectively into the blended layer of the film, e.g., into only a first phase (e.g. a continuous phase) of the blended layer, or into only a second phase (e.g. a disperse phase) of the blended layer, or into both the first and second phase. The level of absorptivity (controlled by the local absorption coefficient) is desirably set to an intermediate level so that an adequate portion of the directed light beam is absorbed in the tailored absorbing region 915b of the film, but the absorptivity is not so high that an excessive amount of heat is delivered to the incident end of the region 915b relative to the opposite end. In many instances, the absorptivity in absorbing region 915b is still reasonably weak, e.g. the relative intensity profile 914 over that region may appear more as a straight line with merely a steeper slope than the other regions, e.g. 915a and 915c. As further described later, the adequacy of the absorption is determined by balancing that absorptivity against the power and duration of the incoming directed light beam to achieve the desired effect.

In an elementary example of the third embodiment, the optical film may have a construction of two thick skin layers with one blended layer therebetween, and the blended layer may be composed of only two polymer materials A and B that make up first and second distinct phases. An absorbing agent is incorporated into polymer material A to increase its absorptivity to a moderate level but no absorbing agent is incorporated into polymer B. Both materials A and B are provided as distinct phases in the blended layer, but the skin layers are composed only of polymer B. Such a construction will have a low absorptivity at the outer surfaces, i.e. the skin layers, of the film, due to the use of the weakly absorbing material B. The construction will have a higher absorptivity in the blended layer due to the use of the more strongly absorbing material A (along with the more weakly absorbing material B) in that layer. Such an arrangement can be used to preferentially deliver heat to an interior layer of the film, in particular to the interior blended layer, rather than to outer surface layers. In particular, conditions may exist wherein at least the outer surfaces of these layers remain essentially unchanged while the internal layers are altered by the reduction of birefringence in at least one phase. Furthermore, these outer layers may maintain the overall film integrity, and may resist the drooping, wrinkling, or thinning of the internal layer or layers (e.g. by resisting shrinkage), or the roughening of the surface, during the radiant heating process. In a minor variant, an absorbing agent may be incorporated into given polymer (e.g. polymer "A") fed into the blend layer, but not into the very same polymer fed into the skin layer. Note that with appropriately equipment the blended layer can comprise three or more different types of polymer materials (A, B, C, . . . ), and an absorptive agent may be incorporated into one, some, or all of the materials in order to provide a wide variety of different absorption profiles so as to deliver heat to selected interior portions of the film.

In a further example of this third embodiment, the skin layers may comprise the blend layers and the core layer may be a facilitating layer that is optically transparent. The facilitating layer may also be loaded with the absorbing agent. Under some conditions, it may be possible to heat the facilitating layer with the radiant beam, and then allow thermal diffusion from the facilitating layer to the blend layers to achieve the selected heating. If the facilitating layer is not heated too much, the temperature front of the thermal diffusion may in some cases drop below an effective threshold before significantly affecting the outer surface of the blend layers. In some cases, the facilitating layer may have a melting point significantly higher than at least one continuous phase of the blend layers. In this case, it may be possible to heat the facilitating layer with the beam without melting the material of the facilitating layer, and then allow thermal diffusion from the facilitating layer to the blend layers to achieve the selected heating and reduction of birefringence in at least a portion of the blend layers. In this manner, the facilitating layer may maintain the overall film integrity, and resist the drooping, wrinkling, and/or thinning of the film during the selective heating process. Likewise, surface roughening can be minimized or eliminated by keeping the outermost surfaces sufficiently cool during the selective heating.

In a still further elaboration of this third embodiment, multiple layer constructions that have alternating blend and facilitating layers may be used. The facilitating layers may be loaded with absorbing agents. The blend layers may also be loaded with absorbing agents, in some cases, loaded at a lower concentration or weight percent than the facilitating layers. The outermost skin layers may be either blend layers or non-optical skin layers, without absorbing agents. The skin layers may be thicker than any of the individual internal blend layers in this case. When the facilitating layers are heated just enough to cross the temperature thresholds for conversion of the blends from the first to second states, then it follows that the thermal diffusion front will be insufficient to raise the surface of an outer blend skin layer above this threshold. Using the thermal front from the facilitating layers to accomplish the selective heating through the thickness of the film may also be particularly advantageous when the scattering increases from the first to second zones. If the layers are thick enough and the energy is introduced quickly enough, the thermal increases can be more contained within the facilitating layers during the actual application of the radiant beam. The thermal diffusion then accomplishes the selective heating after the application of the radiant energy is completed at a selected in-plane location. Of course, thermal diffusion will also spread the transition between the first and second zones across the plane. In some cases, the increase in the transition length in-plane can be kept to about the same dimension as the thickness of an individual blend layer in the construction.

In these various examples, construction and processing design features include the thickness of the outer layers relative to the inner absorbing layers, the relative densities, heat capacities, thermal diffusivities, the concentration and absorption coefficients of the absorbing agents in the various layers, as well as the intensity, beam shape and duration of the applied radiant beam. For example, in the schemes using absorbing facilitating layers, these should have enough heat capacity to deliver the required energy in the thermal front. Likewise, the total amount of energy delivered to the film should be low enough to achieve the desired effect at the outermost surfaces of the film. Multiple and adjacent facilitating layers with different loadings (concentration) of absorbing agents may also be used to manage the thermal diffusion front during and after the application of the radiant energy.

The dispersion and placement of the absorbing agents in the blend layers themselves should also be considered. In many instances, it may be advantageous to load the absorbing agent into the phase to be reduced in birefringence. In this manner, thermal distributions may be more uniform and thresholds for birefringence reductions more clearly defined. On the other hand, the quality of the dispersion within the phase may also be important. In the case of a miscible dye as the absorbing agent, it may be advantageous to load the absorbing agent into the material with which it has a higher miscibility, if the phases are small enough. The absorbing agent may also migrate, at least in part, in the process of flow of the blend, from one phase to the other or into the phase boundaries. Physical dispersions may also be better formed in one or the other phase material. When the absorbing agent is present at least in part as particles or aggregates, it is generally preferred to have smaller particle sizes so that the agent does not overheat relative to the surrounding polymeric material, causing degradation or other darkening or so-called "marking" of the polymer. Average particles sizes of 5 microns, 2 microns, 1 micron, 0.5 microns, or less than 0.5 microns are desirable. It is often advantageous to pre-mix the absorbing agent into the desired polymeric material, e.g. to form a so-called "masterbatch" prior to introduction of the materials into the extruder. The absorbing agent can be milled or otherwise ground prior to addition. In some cases, the absorbing agent can be incorporated in the resin as it is being polymerized.

Similar absorption profiles as those of the foregoing embodiments may be obtained using the inherent absorption characteristics of the various native materials used in the optical film. Thus, the film construction may comprise different materials having different absorption characteristics among the various layers or phases of the film, and those various layers or phases may have been formed together during film formation (e.g. by extrusion and orienting machinery), or may have been formed as separate precursor films which were later combined e.g. by lamination.

We now reiterate and embellish upon aspects of the foregoing teachings and disclosure.

The foregoing disclosure may be considered to describe, among other things, "write-able" diffusely reflective optical films that can be altered by noncontact, radiative means after its initial manufacture. The diffusely reflective optical film may comprise at least two materials that form distinct first and second phases of a blended layer, furthermore optionally comprising an absorbing agent which may for purposes of the present discussion be referred to as a third material, dispersed in either or both of the other two materials. We also disclose a process using a directed radiant energy treatment of a specified spectral band to selectively melt and disorient, in part or in whole, at least one of the first and second phases (one or both of which may contain the absorbing agent) in order to reduce or eliminate the birefringence in these materials. The treatment is applied to chosen spatial locations across the film plane. Also disclosed is the finished optical film itself with the spatially tailored optical variations after treatment. The disclosed films can be used in business processes in which an originally uniformly cast and drawn optical body is spatially tailored to conform to the individual requirements of a given application.

One aspect of particular interest is the controlled spatial patterning of diffusely reflective optical films containing, for example, near-IR absorbing dyes or other absorbing agents by selectively removing the birefringence of chosen interior optical materials (e.g. a given phase of a blended layer) while leaving other interior or surface layers relatively unchanged by subsequent treating with pulsed IR laser sources or other suitable high radiance light sources.

The films disclosed herein (both prior to selective heat treatment and after selective heat treatment), in which the birefringence of at least some of its internal materials can be reduced in one or more zones of the film to provide a second diffusely reflective characteristic, different from the initial or first diffusely reflective characteristic, may be referred to as STOF: Spatially Tailored Optical Films.

The films, methods, and business processes may be generally useful in any application in which a spatially controlled level of orientation is desired. Fields of interest may include, for example, display, decorative, and security applications. Some applications may overlap multiple fields. For example, some articles may incorporate the internally patterned films disclosed herein in combination with a film, substrate, or other layer that includes conventional patterning in the form of indicia, for example. The resulting article may be useful in security applications, but versions of it may also be considered decorative. Selectively heat treating such an article may produce zones in the internally patterned film that selectively obstruct (by increasing reflectivity) or reveal (by decreasing reflectivity) portions of the conventional patterning of the other film, depending on the design of the internally patterned film.

The STOF films and articles may be used in a wide variety of displays and other extended area optoelectronic devices, such as backlights, signs, luminaires, channel letters, light guiding or light piping systems, and the like. Such devices may emit polarized or unpolarized light. Such devices may emit white light, i.e., light perceived by an ordinary observer as nominally white, or light of a particular color other than white. Such devices may comprise arrays of liquid crystals, organic light emitting devices (OLEDs), and/or light emitting diodes (LEDs), for example. Such devices may be or comprise a 3-dimensional display, e.g., a stereoscopic display. Such devices may be or comprise transmissive displays, reflective displays, and/or transflective displays. Such devices may include edge-lit displays and/or direct-lit displays.

Further in regard to security applications, the disclosed films may be used in a variety of security constructions including identification cards, driver's licenses, passports, access control passes, financial transaction cards (credit, debit, pre-pay, or other), brand protection or identification labels, and the like. The film may be laminated or otherwise adhered as interior or exterior layers to other layers or portions of the security construction. When the film is included as a patch, it may cover only a portion of the major surface of the card, page, or label. In some cases, it may be possible to use the film as the base substrate or the only element of the security construction. The film may be included as one of many features in the security construction such as holograms, printed images (intaglio, offset, barcode, etc.), retroreflective features, UV or IR activated images and the like. In some instances, the disclosed films may be layered in combination with these other security features. The film may be used to provide a personalizable feature to the security construction, for example, a signature, an image, an individual coded number, etc. The personalizable feature may be in reference to the individual document holder or a specific product entity, such as in the case of a manufacturer tag, a lot verification tag, a tamper-proof coding, or the like. The personalizable feature can be made with a variety of scanning patterns including lines and dot patterns.

The writable film may provide both overt (e.g. clearly visible to an ordinary observer) and covert security features to the security construction. For example, a writable diffusely reflective polarizer layer can provide a covert feature viewable with a polarizing analyzer, e.g. a feature that disappears depending on the polarization state of the analyzer.

Additional useful articles that can be made using the disclosed writable diffusely reflective films include a wide variety of identification documents (ID documents). The term "ID documents" is broadly defined and is intended to include, but not be limited to, passports, driver's licenses, national ID cards, social security cards, voter registration and/or identification cards, birth certificates, police ID cards, border crossing cards, security clearance badges, security cards, visas, immigration documentation and cards, gun permits, membership cards, phone cards, stored value cards, employee badges, debit cards, credit cards, and gift certificates and cards. ID documents are also sometimes referred to as "security documents". The articles of this disclosure may be the ID document or may be part of the ID document. Other useful articles that may be made using the disclosed patternable films include articles containing color images and items of value, such as, for example, currency, bank notes, checks, and stock certificates, where authenticity of the item is important to protect against counterfeiting or fraud, as well as articles that can be used to produce informative, decorative, or recognizable marks or indicia on product tags, product packaging, labels, charts, maps, and the like.

Still more useful articles that can utilize the disclosed writeable diffusely reflective films include passports, ID badges, event passes, affinity cards, product identification formats and advertising promotions for verification and authenticity, brand enhancement images, identification presentation images in graphics applications such as emblems for police, fire, or other emergency vehicles; information presentation images in graphics applications such as kiosks, night signs, and automotive dashboard displays; and novelty enhancement through the use of composite images on products such as business cards, hang-tags, art, shoes, and bottled products.

Many of the features described here for security applications are likewise useful for decorative applications. For example, a personalized logo can be thus embedded in a consumer article.

Laminate constructions have been mentioned above, but they, and other types of optical bodies that incorporate a diffuse STOF-type film as disclosed herein joined or combined in some fashion with another film or substrate with different optical properties, deserve further discussion. In some cases the "another film or substrate" may be or comprise an otherwise conventional optical film or substrate, such as an absorbing polarizer, a colored light transmissive film (e.g. a single layer polymer that has been dyed), a retarding film, a glass plate, white or colored cardstock, and the like, and combinations thereof. In some cases the "another film or substrate" may also or alternatively be or comprise a multilayer optical film, whether a polarizer, mirror, window, or combinations thereof, having one or more packets of microlayers tuned to reflect light over a selected portion of the electromagnetic spectrum.

The disclosed films and optical bodies can be radiatively treated in a chosen spectral range that may be outside a spectral band normally transformed by the optical body for a chosen application of interest. The radiative treatment may be achieved by any variety of means which can focus light of the selected spectral band at a sufficient intensity on a chosen location of the film. A particularly suitable means for the radiative treatment is a pulsed laser. This may be an amplified pulsed laser. In some circumstances, the laser may be tunable. For example, an optical film operationally reflective in the visible band may have an absorber in the near IR, or the near UV if the polymer is not particularly absorptive there. Preferably, the film should not reflect the directed radiant energy for the angle of incidence chosen for this directed radiant energy, although treatment may still be possible if the reflection is sufficiently low. Radiant energy from lasers is frequently substantially polarized. As mentioned above, it can be useful to orient the impinging beam at an angle and polarization coincident with a minimum in diffuse reflectivity of the optical film to maximize energy delivery to interior portions of the film and to minimize energy loss.

Management of the absorbed radiant energy through the thickness of the film and the resulting thermal pulse through the thickness, is one aspect of the present disclosure. Controlled melting resulting in reduced or eliminated birefringence of one or more materials or phases in the blended layer calls for a reasonably low level of absorption of the directed radiation to ensure uniform effect. The materials in the treated layers(s) should not over-heat either from a time pulse or thermal standpoint resulting in either excessive ionization or thermal decomposition. For example, if one considers a purely heat capacity driven situation, a material brought from 25 degrees C. to a desired 300 degrees C. heats up 275 degrees C. If the selected layer absorbs 10% of the directed radiation, then the front portion closest to the source of the directed radiation needs to heat up to about 330 degrees C. in order for the back portion to heat up to the desired 300 degrees C. Sufficient headroom between the hottest portion of the film and deleterious temperatures or ionizing conditions should be maintained. Through-thickness temperature control may be important to selectively remove birefringence from only one material, e.g., to prevent overheating. In some cases, preheating may be desired. Efficiency of the process, from a laser energy perspective, can be increased by preheating the film before and during laser exposure. The preheat temperature of the film should be above room temperature but below the melting temperature for the polymers used in the blended layer. Typically, when the film is pre-heated throughout its thickness, then a larger amount of the directed radiation may be absorbed for the same level of thermal headroom. For example, when a back portion of a selected film region at 200 degrees C. is heated to 300 degrees C. for a difference of 100 degrees C., the front portion will only be overheated to 310 degrees C. when about 10% of the incident energy of the beam is absorbed. In this case, the selected region could absorb up to about 23% of the directed radiation, to again result in heating up to about 330 degrees C. with a temperature rise of 130 degrees C. for the front portion and a 100 degree C. rise for the back portion to again reach the desired 300 degrees C. The amount of preheating may need to be controlled to prevent wash-out of the thermal pulse during cooling resulting in significant melting beyond the selected region. Generally, the higher the pre-heating, the closer the remainder of the film thickness is to melting. These non-selected portions can become liable to melting as the thermal pulse spreads. The maximum temperatures induced by the directed radiation, the sidedness of the film construction with its various layer thicknesses, the pre-heating gradient through the film, and the path of the directed radiation, all may need to be considered together to optimize the film and process. In fact, the thermal management is even more complicated, because sufficient energy is preferably absorbed not only to raise the material into its melting range but also to actually cause the melting. The management of the energy pulse(s) of the directed radiation should include the time factor to ensure that melting can in fact occur and that the thermal wave is adequately contained along the thickness- or z-axis to prevent undesired melting, such as to melt a birefringent material or phase in one blended layer without melting birefringent materials or phases in another blended layer of the optical film. In particular, the sequence and duration of the pulses may need to be carefully controlled.

The power, scan speed, and beam shape of a laser source (if a laser source is used for the selective heating) and the dye loading (or loading of another absorbing agent, if in fact any absorbing agent is used) combine to provide an effective energy transmitted to the processed region of the film under adiabatic conditions. Although thermal conditions are not generally adiabatic in practice, approximate laser processing conditions can be estimated by determining the required energy for conversion assuming adiabatic conditions with a specification of the film construction, background temperature, and knowledge of the various heat capacities, heats of fusion, and melting points of the pertinent materials. Dispersion of the IR absorber or other absorbing agent may be an important consideration, including dye solubility limits and dissolution mechanics. For undissolved dyes and pigments, particle size and shape distributions may be important. For example, excessively large absorbing particles can over-heat relative to their surrounding film matrix, causing film defects such as degradation, wrinkling, blistering, layer delamination, or other damage. Film cleanliness may also be important, since surface and embedded dust and similar particulate matter may also cause random or unanticipated defects. Other considerations include the beam shape and frequency (if a pulsed source is used) of the laser source, the scanning pattern, the mounting of the film (e.g. onto a card or other substrate by lamination such as with an adhesive or by other means), and the heat transfer, e.g. as controlled by the various thermal conductivities within and heat transfer coefficients from the film.

Management of the absorbed radiant energy across the film plane may also be important to ensure the desired spatial feature. Beam size and focus can also be important process controls. In some cases, it may be desirable to place the film at a location where the beam is focused to its smallest size, while in other cases the film may be deliberately placed at a location where the beam is defocused by a desired amount. The manner of scanning the film and how quickly the directed light beam path can overlap or turn on itself during processing of an area can alter surface roughness, smoothness, haze, wrinkling and other phenomena. With regard to the film preheating discussion above, the beam may be controlled in such a way that a portion of the film currently being irradiated is close to a portion of the film that was recently irradiated, so that the heat provided by the laser itself can be considered to preheat the portion of the film currently being irradiated. This may occur, for example, where the beam is scanned along a first path, and soon thereafter (while the portion of the film along and close to the first path is still at an elevated temperature) scanned along a second path that is adjacent to, or even somewhat overlapping with, the first path.

Time-related aspects such as the duration of the directed radiation may also be important. We have found that relatively short, pulsed operation is often advantageous. For example, in some typical cases we have found that the heating time, as determined by the duration of the laser exposure, is preferably in the range of 10 nanoseconds to 10 milliseconds. The upper exposure duration is a function of the amount of thermal diffusion into other portions of the film through the thickness that can be tolerated for the given application. The shorter the duration, the more compact the delivery of the energy into the desired film region of interest; for example, it may be possible to establish a momentary heat pulse mostly contained within the desired packet. The details of the thermal diffusion are a function of the materials, the anisotropic thermal conductivities at the particular material orientation conditions, the densities, the heat capacities, the thickness of the regions of interest, the beam durations, and the like. In exemplary embodiments, the energy absorbed by the blended layer is of sufficient intensity and duration to melt at least one of the distinct phases in the blended layer but of insufficient intensity and duration to evaporate, significantly chemically modify, or ablate components of the film.

In order for the laser exposure to modify the birefringence of a material phase in the second zone, both high intensity (high power/unit area) and high energy density are desirable, but not necessary. These characteristics help to ensure that a substantial amount of heat generated by absorption of the directed radiation by the materials in the blended layer stays in the blended layer, by reducing the time needed for treatment. Thermal diffusion reduces the concentration of energy in the layer and therefore may reduce the efficiency of the process. In this regard, it is often desirable for only a small amount of heat to be dissipated outside of the blended layer, either laterally into the first (untreated) zone or within the (treated) second zone to other layers of the film. The more heat dissipated outside of the absorbing layer or layers in the second zone, the less efficient the process in those cases where it is desired to heat only a portion of the thickness of the film in the second zone.

The manner of cooling may also need to be carefully considered. Rapid cooling may be useful in some instances. For example, rapid cooling may prevent hazing of the film, e.g. by re-crystallization of the one or more of the phases, during the cooling process. Cooling from one or both sides of the film may be desirable. Another important aspect can be the use of additional layers, co-extruded with the blend layers, or later added to the film construction, e.g. by pressure and/or adhesive lamination to provide effective support and as a heat sink for the thermal diffusion front during and immediately after processing. In some instances, these additional layers may be part of a polymeric card, e.g. as part of a security article. Furthermore, these additional layers may help to maintain the overall film integrity, and may resist the drooping, wrinkling, or thinning of the blend layer or layers (e.g. by resisting shrinkage), or the roughening of the outer surface, during and after the radiant heating process.

Reasonably low levels of absorption of the directed radiation may also be important for end-use applications. It is desirable that environmental exposure not unduly overheat the film. In particular, near IR absorption may result in film heating when exposed to direct sunlight. Preferably, the expected flux does not raise the film temperature unduly. For example, it may be desirable to maintain the temperature of the system below the glass transition temperature of the film under normal use. The amount of energy absorption is in part related to the amount of energy that must be captured from the pulses to achieve the needed temperature difference from the given level of pre-heat.

The desired absorption in the system may thus be optimized, balancing the flux levels, thermal diffusion (wash-out), preheating, and cooling to achieve the desired uniformity and extent of treatment while minimizing end-use concerns, such as color, grayness, or environmental radiant absorption.

It may be useful to incorporate energy absorbing buffer layers or regions between the functional layers or regions of the film. These buffer regions can heat up and even partially or totally melt while protecting another functional region of the film from heating via thermal diffusion (wash-out). In one example, this buffer region could be layers between blended layers of a similar or different material than that used in the blended layers. In another example, a lower melting temperature material can be used as "thermal speed bump" between functional layers of higher melting temperature materials.

The melting point and/or softening point (e.g., the glass transition temperature) of a material in a polymer film can be measured and analyzed using differential scanning calorimeter (DSC) techniques. In such techniques, the film sample may first be suitably dried, e.g. under vacuum of less than 200 mTorr for about 48 hours at 60 degrees C. before testing. A sample of about 5 mg may then be weighed and sealed in a hermetically sealed aluminum Tzero pan. A heating-cooling-heating ramp may then be conducted over a suitable temperature range, e.g., 30-290 degrees C. A constant heating rate of 20 degrees C./min, or other suitable heating rate, can be used for the ramp. After the scan, the first heating thermal trace may be analyzed for softening step changes and melting peaks. The analysis may reveal both the melting temperature and the characteristic bandwidth associated with the melting temperature, the bandwidth referred to as the peak width at half height (PWHH). Finite values of PWHH reflect the fact that a material can melt over a finite range of the temperatures rather than at a single precise temperature. The PWHH may become important for articles whose different materials have (peak) melting temperatures that are close to each other. The DSC technique was used to measure the melting temperature and PWHH for three exemplary materials suitable for use in diffusely reflective optical films: polyethylene naphthalate (PEN); a naphthalate-based copolymer of PEN, so-called PEN-CHDM10 of U.S. Patent Application Publication US 2009/0273836 (Yust et al.), referred to herein as "PEN-Gb"; and a PEN-based polymer in which 20% of the dimethyl 2,6-naphthalene dicarboxylate (NDC) is substituted with 4,4'Biphenyldicarboxylic acid dimethyl ester, referred to herein as "PENBB20". Samples of these materials were measured, and exhibited melting points of 261, 248, and 239 degrees C. for the PEN, PEN-Gb, and PENBB20 samples respectively. The PWHH of the samples were also measured. The PWHH of the PEN sample was 7 degrees C., but depending on processing conditions of the polymer this may range from 5 to 10 degrees C. The PWHH of the PEN-Gb sample was 6 degrees C., but depending on processing conditions this may range from 5 to 15 degrees C. The PWHH of the PENBB20 sample was 10.4 degrees C., but depending on processing conditions this may range from 5 to 15 degrees C. In general, the PWHH of a polymer film may be decreased by heat setting the film at a suitable temperature below the melting point for a suitable time.

In general, for any particular wavelength band for the directed radiation, the absorptive power of the remainder of the film along the thickness direction may be tailored to be sufficiently low, relative to the selected portion of the film for this radiation, to prevent undesired over-heating and undesired alteration of these non-selected portions. The film extrusion process may be designed to ensure that migration of the actively absorbing material of a selected portion of the film from that portion to another functional portion of the film does not happen to a significant degree. Again, a buffer layer that blocks such migration, e.g. through chemical nonaffinity, can be used. Processing methods, including residence times for layer contact and the like, can also be used.

The directed radiant treatment may be achieved directly after or even during film manufacture, separately but still in roll form, after sheeting, or after mounting to another substrate such as a glass plate, or plastic or paper cardstock. The level of precision should be balanced against the process variations. For example, web flutter should be sufficiently handled for a roll process. The directed radiant treatment could be achieved as the film moves over a roller while the film is under tension, perhaps between nips. A protective film can be placed between the film and the rollers to continuously clean the rollers and otherwise prevent cosmetic defects such as scratches. In another example, the film can be mounted on a fixed substrate after sheeting, or mounted or fixed over a temporary backing in a semibatch manner. For example, portions of the film roll can successively contact a protective film and slide over a plate. The film roll conveyance could stop, the designated portion over the plate could be slightly tensioned as desired, and then the directed radiant treatment applied over the designated portion backed by the plate. The finished roll portion may then be moved off the plate treatment zone by a successive conveyance by which the successive portion of the roll may be treated, and so on until the entire roll is treated.

The interior patterning method described herein may also be combined with known techniques, e.g. ablative, surface amorphization techniques, focusing methods, embossing, thermoforming, etc.

Several factors in combination may make a dye particularly suitable for the present application. Thermal stability through the extrusion process is particularly desirable. In general, the extrusion process is desirably hot enough to both melt and allow the conveyance of the melt streams at suitably manageable pressure drops. For example, polyester based systems may require very high stability up to about 280 degrees C. These requirements can be reduced by using co-polymers of various polymers, such as coPENs, e.g. with processing around 250 degrees C. Olefinic systems like polypropylene, and polystyrene, are typically less demanding. The choice of resins in a particular diffusely reflective optical film construction can narrow the choices of potential absorbing material candidates, as can dye migration tendencies, the ability to be uniformly dispersed in the desired materials layers, the chemical affinities of the dye to the various materials, and so forth.

The teachings of this application can be used in combination with the teachings of any or all of the following commonly assigned applications, which are incorporated herein by reference: PCT Publication WO 2010/075357 (Merrill et al.), "Internally Patterned Multilayer Optical Films Using Spatially Selective Birefringence Reduction"; PCT Publication WO 2010/075340 (Merrill et al.), "Multilayer Optical Films Having Side-by-Side Mirror/Polarizer Zones"; PCT Publication WO 2010/075373 (Merrill et al.), "Multilayer Optical Films Suitable for Bi-Level Internal Patterning"; PCT Publication WO 2010/075363 (Merrill et al.), "Internally Patterned Multilayer Optical Films With Multiple Birefringent Layers"; and PCT Publication WO 2010/075383 (Merrill et al.), "Multilayer Optical Films Having Side-by-Side Polarizer/Polarizer Zones"; and the following applications filed on Jun. 30, 2010: U.S. Application Ser. No. 61/360,127, "Retarder Film Combinations With Spatially Selective Birefringence Reduction"; U.S. Application Ser. No. 61/360,129, "Mask Processing Using Films With Spatially Selective Birefringence Reduction"; U.S. Application Ser. No. 61/360,022, "Multi-Layer Articles Capable of Forming Color Images and Methods of Forming Color Images"; and U.S. Application Ser. No. 61/360,032, "Multi-Layer Articles Capable of Forming Color Images and Methods of Forming Color Images".

In many cases, a material layer or phase will exhibit birefringence as a result of the molecular makeup of the material. In some cases, however, a medium (sometimes referred to as an effective medium) may exhibit birefringence as a result of microscopic structures that have a dimension that is small compared to the wavelength of light but large compared to molecular distances. An elementary example of such a medium is a stack of ultrathin layers of different light-transmissive materials. See e.g. U.S. Pat. No. 6,590,707 (Weber). An effective medium of birefringent material may thus be or comprise a stack of ultrathin layers e.g. of alternating polymer materials, for example, where the optical thickness of each of the layers is less than $\frac{1}{4}$, and preferably less than $\frac{1}{8}$, of a wave thick (e.g., less than 150, or 100, or 50 nm thick). Such media may in general be used in the disclosed embodiments.

EXAMPLES

Example 1

A multi-layer optical film was co-extruded comprising an inner core (optical packet) and two outer, diffuse-reflective skin layers. The inner core comprised 151 alternating layers of a higher and lower refractive index polyester. The two outer layers of the optical core were thicker to form two protective boundary layers (PBLs). The PBLs comprised the lower index material. The higher index material was a copolymer of polyethylene naphthalate (PEN), and comprised 90 mol % naphthalene dicarboxylate and 10 mol % terephthalate as carboxylates as described in Example 1 of U.S. Pat. No. 6,352,761 (Hebrink et al.), this copolymer containing both PEN and polyethylene terephthalate (PET) sub-units, and referred to herein as 90/10 coPEN. The lower index material was another copolymer of PEN (i.e., another coPEN) as described in Example 10 of U.S. Pat. No. 6,352,761 (Hebrink et al.), this lower index material referred to herein as 55/45 HD coPEN. The skin layers of the multilayer optical film comprised a 9:5:2:1 weight mixture of 90/10 coPEN, syndiotactic polystyrene (obtained under the trade designation "QUESTRA NA 405" from Dow Chemical Company, Midland, Mich.), about 0.8 intrinsic viscosity polyethylene terephthalate (obtained under the trade designation "MELINAR" from ICI Americas, Inc.) and a styrene copolymer (obtained under the trade designation "DYLARK 332-80" from Nova Chemical Company, Moon Township, Pa.), respectively. The mixture further comprised about 0.13 wt. % of an infra-red (IR) absorbing dye (obtained under the trade designation "EPOLITE 4121" from Epolin, Newark, N.J.). Each skin and the optical packet were approximately of equal weight in the cast web construction, which measured about 1 mm in thickness.

The cast web was drawn simultaneously and biaxially at about 125° C. at an initial rate of 50%/sec. to approximate draw ratios of 2×2. The film was further drawn uniaxially at an initial rate of about 25%/sec. to final draw ratios of about 5.5×1.8. The resulting film was a translucent polarizer about 100 micrometers thick, with a high degree of diffuse reflection.

Figure 10:
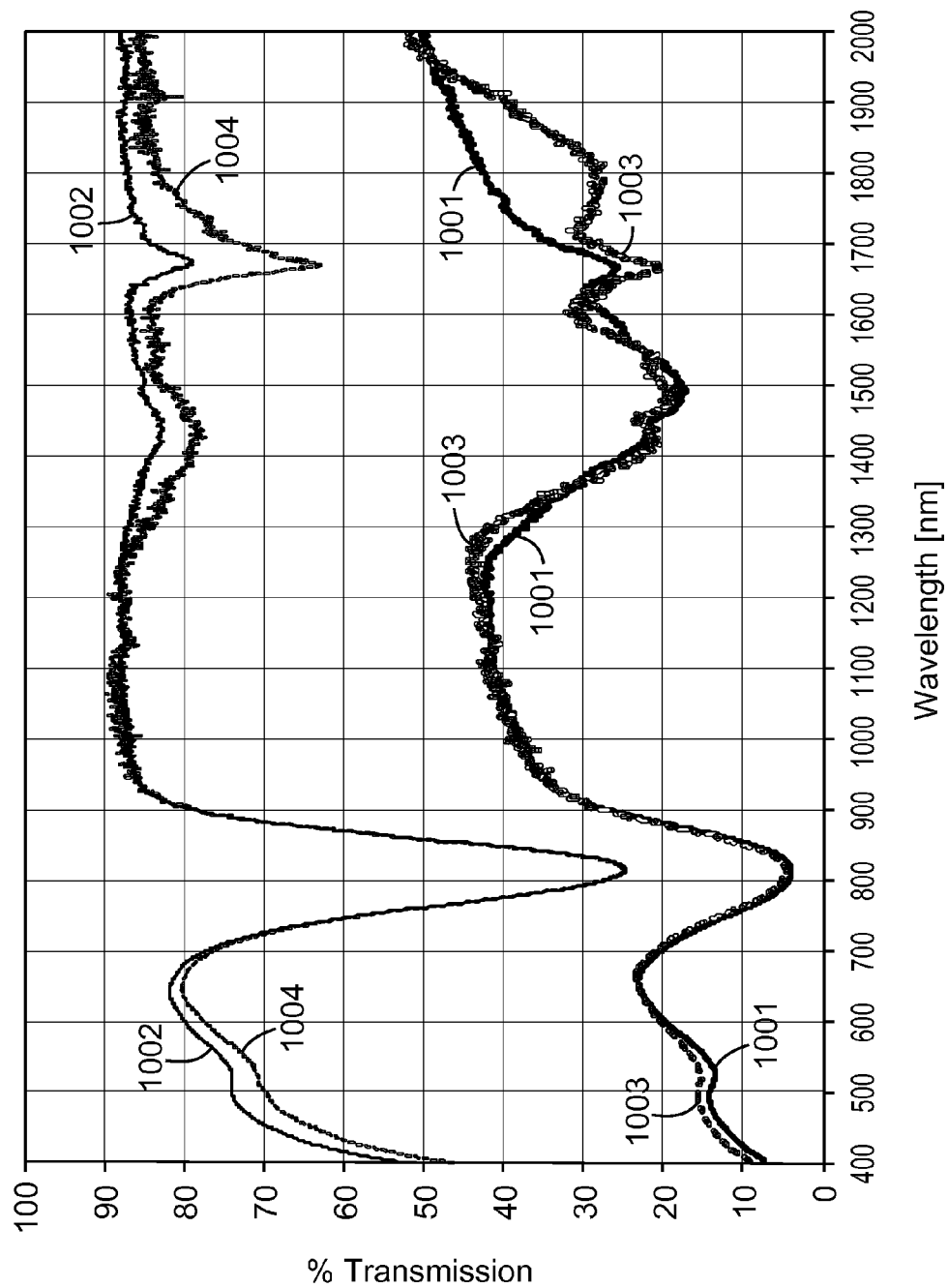
FIGS. 10 and 11 are measured transmission spectra of various diffusely reflective optical films.

Using a spectrophotometer (obtained under the trade designation "LAMBDA 950" from Perkin-Elmer, Norwalk, Conn.) equipped with a large integrating sphere, the transmission spectrum through the translucent polarizer film was measured in the block state with polarization along the draw direction (see curve 1001 in FIG. 10), and in the perpendicular in-plane pass state (see curve 1002 in FIG. 10). The spectra show the higher transmission of the film in the pass state relative to the block state across the visible band (400 nm-700 nm) and through the near IR (to 2000 nm). The spectra also show the operation of the IR reflecting optical core with a band extending from about 1300 nm to 1900 nm. The sharp drop in transmission around 1670 nm is an absorption peak characteristic of the materials and is present in film of similar construction but without the multi-layer optical packet core. Finally, the absorption peak of the IR dye ("EPOLITE 4121") around 812 nm is evident.

The translucent polarizer film was then laminated into the center of a construction with top and bottom polycarbonate cover layers, wherein each cover layer was about 100 micrometers thick. Each polycarbonate cover layer comprised two pieces of about 50 micrometer thick clear polycarbonate security film (available under the trade designation "3M™ PC Security Films" from 3M Company, St. Paul, Minn.). The two pieces were each cut from the same sheet and crossed perpendicularly to eliminate any residual birefringence and optical retardation in the polycarbonate cover layers. The top clear sheets, the diffuse reflective polarizing film, and the clear bottom sheets were stacked in this order and laminated in a press using about $4.1 \times 10^7$ Pa (about 6000 psi) pressure and 165° C. for about 30 minutes. The transmission spectrum through the resulting film laminate was measured in the block state with polarization along the draw direction (see curve 1003 in FIG. 10), and in the perpendicular in-plane pass state (see curve 1004 in FIG. 10). In each case, the spectrum was similar to the diffuse reflective polarizing film before lamination.

Figure 11:
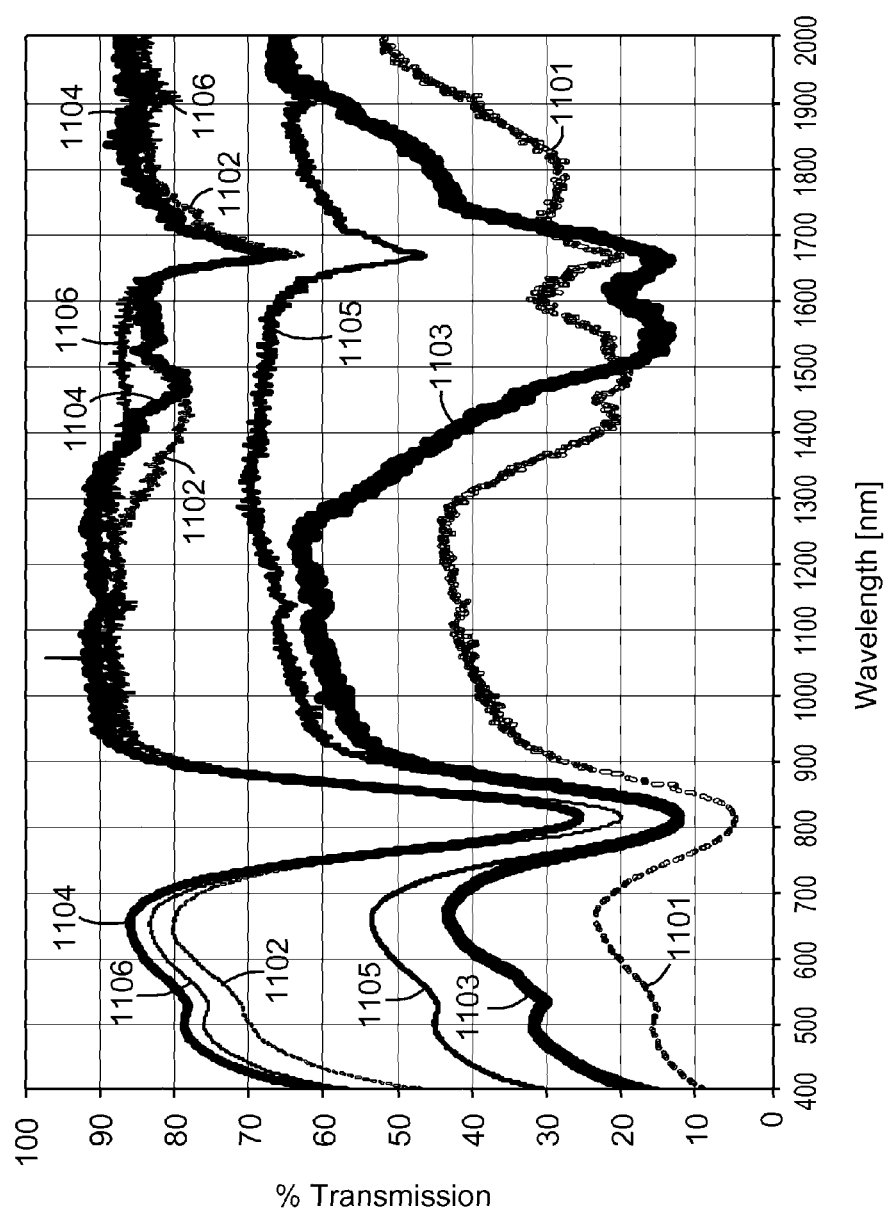

The laminated construction was then treated using radiant energy provided by an 808 nm laser diode. The film laminate was linearly scanned at 175 mm/sec., over a 1 cm by 1 cm area, using an average power of 848 mW and a line separation of about 30 micrometers. Polarized optics were used so that the polarization state of the laser approximately coincided with the pass state of the diffuse polarizing film. The processed regions of the diffuse polarizing film became significantly clearer, with a weakly diffusive character. The outer polycarbonate cover layer remained smooth to the touch in the processed regions. The transmission spectrum through the processed region of the film laminate was measured in the original block state with polarization along the draw direction (see curve 1103 in FIG. 11), and in the perpendicular in-plane pass state (see curve 1104 in FIG. 11). For comparison purposes, curve 1101 (identical to curve 1003 of FIG. 10) and curve 1102 (identical to curve 1004 of FIG. 10) are also provided. The results confirm the conversion of the processed regions to a weaker polarizer, with a lower diffuse reflective characteristic across the visible band. In the infrared, the optical packet substantially maintained its optical reflectivity within a substantial portion of the band in the range from about 1300 nm to 1900 nm. In this manner, the diffuse reflective polarizing film on the interior of the laminate was processed while the outer laminated polycarbonate cover layers and the interior core multilayer optical layer packet remained intact.

In a second treatment, a different region of the laminated construction was processed using the 808 nm laser diode linearly scanned at 290 mm/sec., over a 2 mm by 2 mm area, using an average power of 848 mW and a line separation of about 30 micrometers. Polarized optics were used so that the polarization state of the laser approximately coincided with the pass state of the diffuse polarizer. The processed regions of the film became still clearer than the previous treatment. The transmission spectrum through the processed region of the film laminate was measured in the original block state with polarization along the draw direction (see curve 1105 in FIG. 11), and the in the perpendicular in-plane pass state (see curve 1106 in FIG. 11). The results confirm the conversion of the processed regions to a still weaker polarizer. Moreover, in the infrared, the optical packet has now substantially lost its optical reflectivity in the range from about 1300 nm to 1900 nm. The material absorption peak at 1670 nm was still present. In this manner, both the diffuse reflective interior layers and the optical core layer packet have been substantially reduced in reflectivity.

The foregoing Example 1 could be repeated, except that an additional infra-red absorbing dye (for example, such as that available under the trade designation "AMAPLAST IR-1050" from ColorChem, Atlanta, Ga.) could be introduced into the optical core material streams to allow for separate processing of the optical packet layers relative to the diffuse reflective blend layers. This could allow processing of the optical packet using a laser at 1064 nm.

The foregoing Example 1 could also be repeated, except that a single material, such as a 90/10 coPEN, could be extruded into the core, to form a three-layer construction having diffuse reflective outer layers in the initial film. Such a film could also be subsequently included in a laminate.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. An optical film, comprising:
    a blended layer comprising first and second polymer materials separated into distinct first and second phases, respectively, the layer extending from a first zone into a second zone, and having substantially the same composition and thickness in the first and second zones;
    wherein at least one of the first and second phases is a continuous phase, and the first and/or second polymer material associated with the continuous phase is birefringent in the first zone;
    wherein in the first zone the layer has a first diffusely reflective characteristic;
    wherein in the second zone the layer has a second diffusely reflective characteristic different from the first diffusely reflective characteristic;
    wherein the difference between the first and second diffusely reflective characteristics is substantially attributable to a difference in birefringence of at least one of the first or second polymer materials between the first and second zones; and
    wherein the first zone and the second zone are distinct zones.

2. The film of claim 1, wherein the blended layer also has substantially the same blend morphology in the first and second zones.

3. The film of claim 1, wherein the first phase is a dispersed phase and the second phase is a continuous phase.

4. The film of claim 1, wherein the first and second phases are co-continuous phases.

5. The film of claim 1, wherein the second phase is a continuous phase, and the second polymer material is birefringent in the first zone and less birefringent or isotropic in the second zone.

6. The film of claim 5, wherein the first polymer material is isotropic in the first and second zones.

7. The film of claim 5, wherein the first polymer material is birefringent in at least the first zone.

8. The film of claim 1, wherein at least one of the first and second diffusely reflective characteristics is characterized by substantially different reflectivities for normally incident light of different polarizations.

9. The film of claim 1, wherein at least one of the first and second diffusely reflective characteristics is characterized by substantially the same reflectivity for normally incident light of different polarizations.

10. The film of claim 1, wherein at least one of the first and second diffusely reflective characteristics is characterized by high transmission and low haze for normally incident light of different polarizations.

11. The film of claim 1, wherein the first and second polymer materials are thermoplastics.

12. The film of claim 1, wherein the blended layer further includes a third material that stabilizes a blend morphology of the first and second phases.

13. The film of claim 1, further comprising an absorbing agent that selectively absorbs ultraviolet, visible, or infrared radiant energy.

14. The film of claim 13, further comprising an interior facilitating layer that contains the absorbing agent.

15. The film of claim 1, wherein the first and/or second polymer material associated with the continuous phase has a birefringence of at least 0.03, or at least 0.05, or at least 0.10 in the first zone.

16. The film of claim 1, wherein the polymer material associated with the continuous phase comprises a thermoplastic material whose birefringence in the first zone is the result of a flow process.

17. An article comprising the film of claim 1, wherein the article is selected from the group of an ID document, a security article, a display, a backlight, and an opto-electronic device.

18. The film of claim 1, wherein the first polymer material in the second zone has an isotropic state, or a reduced birefringent state than in the first zone, and the second polymer material in the second zone has substantially the same birefringence as in the first zone.

19. A method of making an internally patterned optical film, comprising:
providing a film that comprises a blended layer including first and second polymer materials separated into distinct first and second phases, respectively, the layer having a first diffusely reflective characteristic in both a first and second zone of the film, at least one of the first and second phases being a continuous phase, and the first and/or second polymer material associated with the continuous phase being birefringent in the first zone; and
selectively heating the film in the second zone in an amount sufficient to cause the second zone to exhibit a second diffusely reflective characteristic different from the first diffusely reflective characteristic, the selective heating being applied without any substantial modification to outer surfaces of the blended layer, and,
wherein the selective heating is carried out without any substantial reduction in thickness of the blended layer in the second zone and wherein the first zone and the second zone are distinct zones.

20. The method of claim 19, wherein the selective heating is carried out without any substantial change in blend morphology of the blended layer in the second zone.

21. The method of claim 19, wherein the selective heating is carried out such that the second diffusely reflective characteristic scatters light of a given incidence direction and polarization less than the first diffusely reflective characteristic.

22. The method of claim 19, wherein the selective heating is carried out such that the second diffusely reflective characteristic scatters light of a given incidence direction and polarization more than the first diffusely reflective characteristic.

23. The method of claim 19, wherein the difference between the first and second diffusely reflective characteristics is substantially attributable to a change in birefringence of at least one of the first and second polymer materials brought about by the selective heating.

24. The method of claim 19, wherein the first polymer material is birefringent in the first zone, and the selective heating causes the first polymer material to be less birefringent or isotropic in the second zone.

25. The method of claim 19, wherein the selective heating comprises directing radiant energy towards at least a portion of the second zone of the film.

26. The method of claim 25, wherein the radiant energy comprises laser light.

27. The method of claim 25, wherein the radiant energy is collimated and/or polarized.

28. The method of claim 25, wherein the radiant energy is directed along an axis approximately coincident with a maximum specular transmission of light through the blended layer of the optical film for the first diffuse reflective characteristic.

29. The method of claim 25, wherein the radiant energy is directed along an axis intermediate a first direction of maximum specular transmission of light through the blended layer of the optical film for the first diffuse reflective characteristic and a second direction of maximum specular transmission of light through the blended layer of the optical film for the second diffuse reflective characteristic.

30. The method of claim 19, wherein the first and/or second polymer material associated with the continuous phase has a birefringence of at least 0.03, or at least 0.05, or at least 0.10 in the first zone.

31. The method of claim 19, wherein the heating is controlled to a temperature that is above the melting or softening point of the first polymer material and below the melting or softening point of the second polymer material.

* * * * *

UNITED STATES PATENT AND TRADEMARK OFFICE
CERTIFICATE OF CORRECTION

PATENT NO. : 9,939,560 B2
APPLICATION NO. : 13/703518
DATED : April 10, 2018
INVENTOR(S) : William Merrill Page 1 of 1

It is certified that error appears in the above-identified patent and that said Letters Patent is hereby corrected as shown below:

On the Title Page

Column 1 item (86) (PCT No.:):
Line 1, delete "PCT/US2011/142358" and insert -- PCT/US2011/042358 --, therefor.

Signed and Sealed this
Twenty-third Day of October, 2018

Andrei Iancu
*Director of the United States Patent and Trademark Office*